US006275760B1

(12) United States Patent
Saito et al.

(10) Patent No.: US 6,275,760 B1
(45) Date of Patent: Aug. 14, 2001

(54) CONTROL SYSTEM FOR AUTOMATIC VEHICLE TRANSMISSIONS

(75) Inventors: Yoshiharu Saito; Norio Nakauchi; Kazuyuki Konno; Tatsuyuki Ohashi; Kenji Hagiwara; Hideki Wakamatsu; Yukio Morita; Takamichi Shimada, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/453,501

(22) Filed: Dec. 3, 1999

(30) Foreign Application Priority Data

Dec. 16, 1998 (JP) .................................................. 10-357684

(51) Int. Cl.[7] .................................................. F16H 61/00
(52) U.S. Cl. .............................. 701/55; 701/56; 701/65; 477/901; 477/902; 477/97
(58) Field of Search ..................... 701/51, 55, 56, 701/65, 208, 213; 477/94, 120, 901, 902, 904, 97

(56) References Cited

U.S. PATENT DOCUMENTS

| 4,335,428 | * | 6/1982 | Miki et al. | 701/65 |
|---|---|---|---|---|
| 4,916,979 | * | 4/1990 | Irwin | 701/55 |
| 5,035,160 | * | 7/1991 | Morita | 701/56 |
| 5,484,350 | * | 1/1996 | Ishikawa et al. | 477/120 |
| 5,531,654 | * | 7/1996 | Ishikawa et al. | 477/901 |
| 5,803,865 | * | 9/1998 | Harada et al. | 477/901 |

FOREIGN PATENT DOCUMENTS

| 5-71625 | 3/1993 | (JP) . |
|---|---|---|
| 5-280624 | 10/1993 | (JP) . |
| 7-286664 | 10/1995 | (JP) . |

* cited by examiner

*Primary Examiner*—Gary Chin
(74) *Attorney, Agent, or Firm*—Arent Fox Kintner Plotkin & Kahn, PLLC

(57) ABSTRACT

A system for controlling an automatic transmission of a vehicle which determines a downgrade or upgrade parameter based on the vehicle acceleration and selects one from among a plurality of shift maps (programs) based on the determined grade parameter to determine a gear ratio based on the selected shift program. The system includes a navigation system which stores the road information including the kinds of road. The system determines whether the vehicle runs on a relative road such an alley or a traffic jammed expressway based on the vehicle speed change, the vehicle-stopping-time and the navigation information and if it does, changes the upshift line of the level-road map in the direction in which the vehicle speed increases such that upshift is not likely to occur, or in the direction in which the vehicle speed decreases such that the upshift is more likely to occur, thereby enhancing driveability.

18 Claims, 26 Drawing Sheets

FIG.4
MAP NUMBER  0 : STEEP-UPGRADE MAP
1 : SLIGHT-UPGRADE MAP
2 : LEVEL-ROAD MAP
3 : SLIGHT-DOWNGRADE MAP
4 : STEEP-DOWNGRADE MAP
   (CORNER-SPORT MAP)
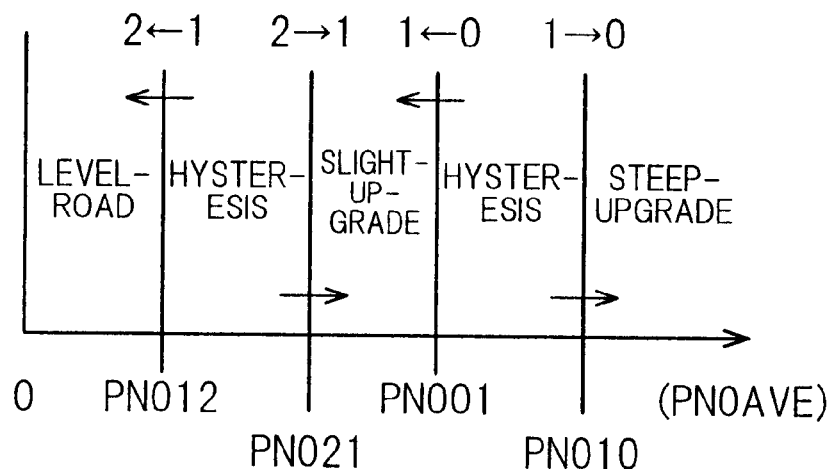
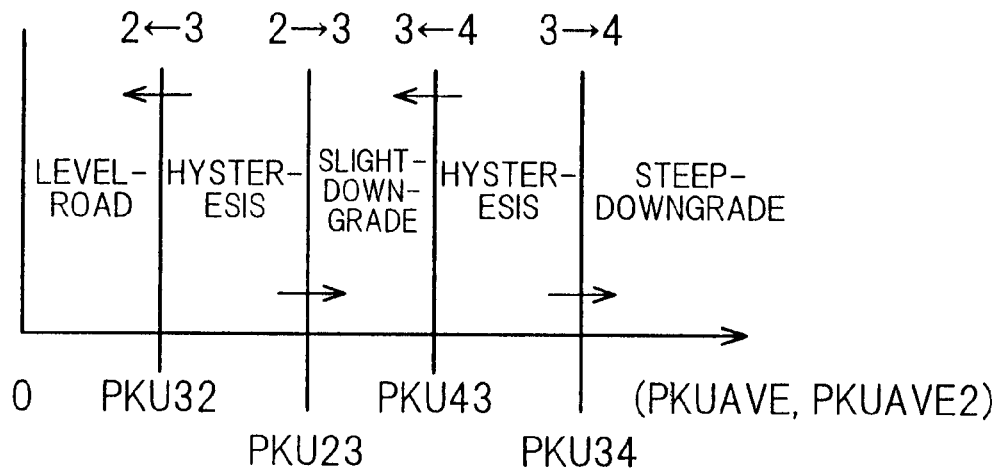

FIG.5

| | PN001 | PN010 | PN021 | PN021 | PKU23 | PKU32 | PKU34 | PKU43 |
|---|---|---|---|---|---|---|---|---|
| LARGEST POSSIBLE MAP | MAP2 | 0 | 1 | 2 | 2 | 3 | 3 | 4 | 4 |
| SMALLEST POSSIBLE MAP | MAP1 | 0 | 0 | 1 | 1 | 2 | 2 | 3 | 4 |
| | | STEEP-UPGRADE | SLIGHT-UPGRADE | LEVEL-ROAD | SLIGHT-DOWNGRADE | STEEP-DOWNGRADE (CORNER-SPORT MAP) |

0←1  1←0

FIG.18
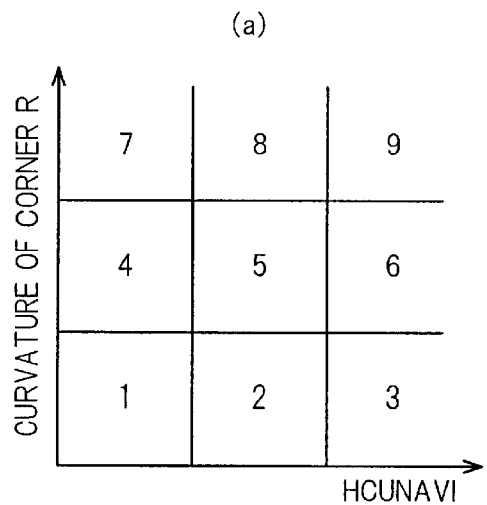
(a)
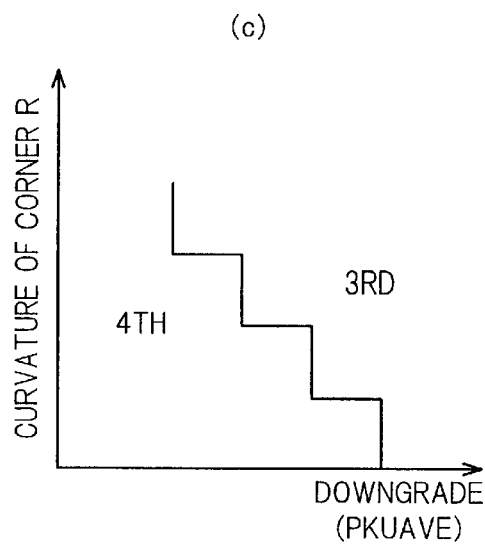
(c)
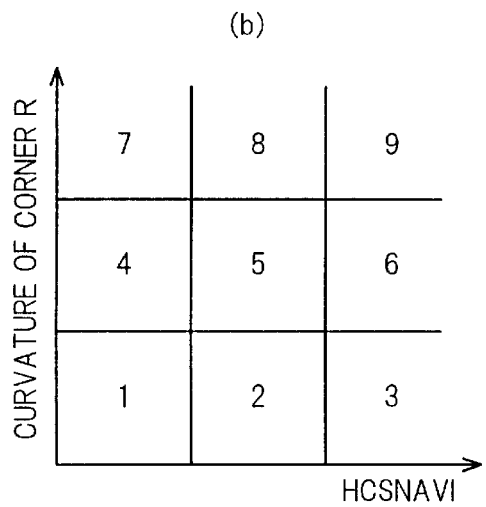
(b)
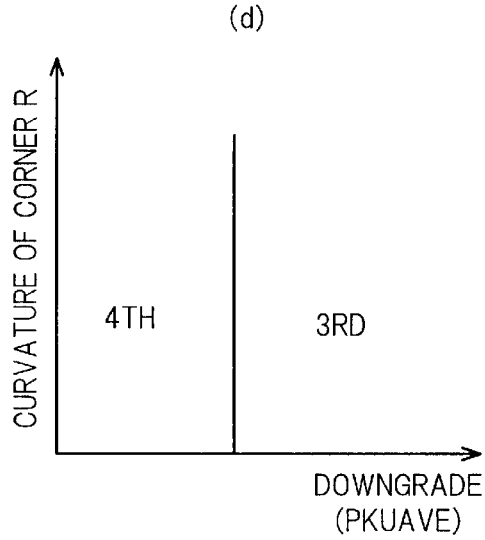
(d)

FIG.24

|  | AVERAGE VEHICLE SPEED | INTEGRATED VALUE OF VEHICLE SPEED CHANGE | VEHICLE-STOPPING-TIME |
|---|---|---|---|
| ALLEY | LOW | LARGE | SMALL |
| TRAFFIC JAMMED CITY ROAD | LOW | MEDIUM | LARGE |
| TRAFFIC JAMMED EXPRESSWAY | LOW | SMALL | SMALL |
| SUBURBAN ROAD | MEDIUM | MEDIUM | SMALL |

CONTROL SYSTEM FOR AUTOMATIC VEHICLE TRANSMISSIONS

BACKGROUND OF THE INVENTION

1. Field of the Invention

This invention relates to a control system for an automatic vehicle transmission.

2. Description of the Related Art

In a typical prior-art control system for automatic vehicle transmissions, the gear ratio of the automatic transmissions is determined by retrieving a predetermined shift program (map) using the vehicle speed and throttle opening as address data.

Moreover, Japanese Laid-Open Patent Application No. Hei 5 (1993)-71625, for example, teaches a control system for automatic vehicle transmission, in which a parameter indicative of the running resistance, more specifically a parameter indicative of the downgrade or upgrade of vehicle running is determined based on the vehicle speed and throttle opening to select one from among a plurality of shift programs (shift characteristics) for upgrade, downgrade, etc., and the gear ratio is determined by retrieving the selected program based upon the vehicle speed and throttle opening such that the gear ratio is appropriate both in upgrade or downgrade vehicle running.

However, if the gear ratio is solely determined and controlled by retrieving a single shift program or one selected from among a plurality of shift programs, whichever it may be, the driveability, i.e., the performance of vehicle running or vehicle driving experienced by the vehicle operator may sometimes be degraded depending upon the road on which the vehicle is traveling.

In order to solve this problem, Japanese Laid-Open Patent Application No. Hei 7 (1995)-286664 teaches determining whether the vehicle runs on a traffic jammed or crowed road, and whether the vehicle runs on an upgrade road. In the prior art control, when it is determined that the vehicle runs on a traffic jammed road, but is not running on an upgrade road, the shift to the 1st gear is inhibited, while when it is determined that the vehicle runs on a traffic jammed and upgrade road, the gear ratio is controlled based on the shift program for upgrade. When the vehicle is determined to be running not on a traffic jammed road, but on an upgrade road, the gear ratio is controlled in response to the determination of upgrade.

Similarly, Japanese Laid-Open Patent Application No. Hei 5 (1993)-280624 discloses making fuzzy reasoning based on the engine load and the jerk of vehicle to determine the degree of certainty, i.e., the degree to which it is believed that the road on which the vehicle is travelling is, in fact, a winding road. When it is determined that the vehicle runs on such a road, the gear ratio is controlled to a lower gear to generate the engine braking effect.

However, although these prior art techniques propose determining whether the vehicle runs on a traffic jammed road, an upgrade road or a winding road and controlling the gear ratio based on the determination, they do not teach determining whether the vehicle runs on a relatively narrow road such as an alley or an expressway under traffic jam conditions and controlling the shift control based on the determination.

When the vehicle runs on a relatively narrow road such as an alley, the vehicle driving should be conducted paying a careful attention to all of the surroundings, and the operation of the accelerator pedal and the brake pedal increases. If the gears are shifted frequently in response to the accelerator pedal operation, this will cause shift hunting (the hunting in control) to occur and degrading the driveability.

Moreover, when the vehicle runs at a low speed on a traffic jammed expressway, if the gear is unnecessarily kept to a lower gear, the engine braking is effected such that the vehicle operator feels the frequency of the engine braking effect too much, thereby similarly degrading the driveability.

Aside from the above, the range of navigation systems extends to embrace everything from simple orientation aids to guidance systems featuring automatic route determination. The navigation system has a road-map memory stored in a CD-ROM or the like, and detects the instantaneous vehicle position by, for example, the GPS (Global Positioning System) satellite position system, and provides directional information on a road map including the detected instantaneous vehicle position.

Since the use of such navigation information enables the recognition or prediction of the details of the road on which the vehicle is traveling, it will be desirable to determine the aforesaid running conditions based on the navigation information and other parameters including average vehicle speed and to conduct gear-shift control in response to the determined running conditions such that the driveability is improved.

BRIEF SUMMARY OF THE INVENTION

An object of this invention is therefore to overcome the aforesaid problems and to provide a control system for automatic vehicle transmission, which determines whether the vehicle is under the running conditions including at least one of running on a relative narrow road or on a traffic jammed expressway and changes the shift characteristics in response to the running conditions, thereby improving the driveability.

In order to achieve the objects, there is provided a system for controlling an automatic transmission of a vehicle having an input shaft connected to an internal combustion engine mounted on the vehicle and an output shaft connected to driven wheels of the vehicle, the transmission transmitting output torque generated by the engine and inputted through the input shaft to the driven wheels through the output shaft, including: operating condition detecting means for detecting operating conditions of the engine and the vehicle including at least a vehicle speed and a throttle opening: grade parameter determining means for determining a grade parameter indicative of upgrade or downgrade of a road on which the vehicle runs; shift program selecting means for selecting one from among a plurality of shift programs based on the determined grade parameter; and gear ratio determining means for determining a gear ratio based on the selected shift program; wherein the system includes: vehicle speed change calculating means for calculating a vehicle speed change in the detected vehicle speeds; road kind discriminating means for discriminating a kind of the road on which the vehicle runs; vehicle-stopping-time calculating means for calculating a vehicle-stopping-time during which the vehicle stops; vehicle running condition deducing means for deducing whether the vehicle is under a specific running condition based on at least the calculated vehicle speed change and the calculated vehicle-stopping-time; and shift program characteristic changing means for changing characteristics of the selected shift program based on the deduced running condition and the discriminated kind of the road such that the gear ratio determining means determines the gear ratio based on the shift program whose characteristics are changed.

BRIEF DESCRIPTION OF THE DRAWINGS

This and other objects and advantages of the invention will be more apparent from the following description and drawings, in which:

FIG. 4 is an explanatory view showing the map selection based on the average value indicative of the grade parameter more specifically;

FIG. 5 is an explanatory view similarly showing the map selection based on the average value indicative of the grade parameter;

FIG. 18 is a set of explanatory graphs showing the characteristic of values referred to in the flow chart of FIG. 16;

FIG. 24 is a table showing the result of analysis of the running conditions made by the inventors from the points of the average vehicle speed, the integrated value of the vehicle speed change and the vehicle-stopping-time;

DETAILED DESCRIPTION OF THE PREFERRED EMBODIMENTS

An embodiment of the invention will now be explained with reference to the attached drawings.

Figure 1:
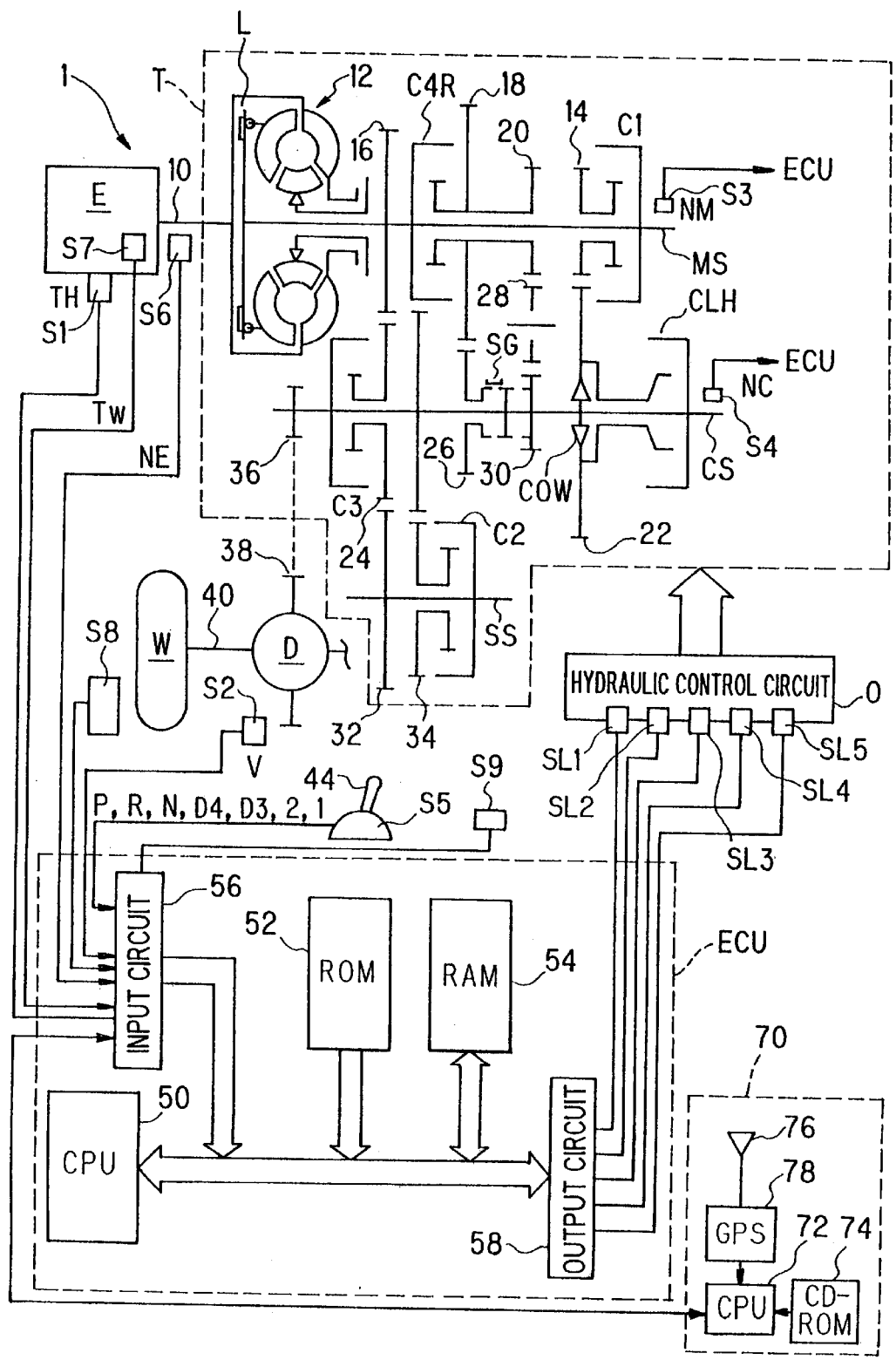
FIG. 1 is an overall schematic view of a control system for an automatic vehicle transmission according to the invention.

FIG. 1 is an overall schematic view of a control system for an automatic vehicle transmission according to the invention.

As shown in FIG. 1, a vehicle 1, illustrated partially by a driven wheel W (referred to later), etc., has an internal combustion engine E (referred to simply as "engine") mounted thereon and an automatic vehicle transmission T (referred to simply as "transmission").

The transmission T is equipped with a main shaft (transmission input shaft) MS connected to a crankshaft 10 of the engine E through a torque converter 12 having a lockup mechanism L. The automatic transmission is configured to be a parallel-shaft type and has a countershaft CS and a secondary shaft SS provided in parallel with the main shaft MS and the countershaft CS. These shafts carry gears.

More specifically, the main shaft MS carries a main first gear 14, a main third gear 16, a main fourth gear 18 and a main reverse gear 20. The countershaft CS carries a counter first gear 22 which meshes with the main first gear 14, a counter third gear 24 which meshes with the main third gear 16, a counter fourth gear 26 which meshes with the main fourth gear 18 and a counter reverse gear 30 which meshes with the main reverse gear 20 through a reverse idle gear 28.

The secondary shaft SS carries a first secondary second gear 32 and a second secondary second gear 34. 1st gear (first-speed) is established or effected when the main first gear 14 rotatably mounted on the main shaft MS is engaged with the main shaft MS by a first-gear hydraulic clutch C1.

Since the first-gear hydraulic clutch C1 is kept in the engaged state during establishment of the 2nd to 4th gears, the counter first gear 22 is fixed by a one-way clutch COW. A first-gear-hold clutch CLH is provided such that the engine E is driven from the driven wheel W, in other words the engine braking is effected when the 1 or 2 range is selected.

2nd gear (second-speed) is established via the main third gear 16, the counter third gear 24 and the first secondary second gear 32, when the second secondary second gear 34 rotatably mounted on the secondary shaft SS is engaged with the secondary shaft SS by a second-gear hydraulic clutch C2.

3rd gear (third-speed) is established when the counter third gear 24 rotatably mounted on the countershaft CS is engaged with the countershaft CS by a third-gear hydraulic clutch C3.

4th gear (fourth-speed) is established when the counter fourth gear 26 rotatably mounted on the countershaft CS is engaged with the countershaft CS by a selector gear SG and with this state maintained the main fourth-gear 18 rotatably mounted on the main shaft MS is engaged with the main shaft MS by a fourthgear/reverse hydraulic clutch C4R.

The reverse gear is established when the counter reverse gear 30 rotatably mounted on the countershaft CS is engaged with the countershaft CS by the selector gear SG and with this state maintained the main reverse gear 20 rotatably mounted on the main shaft MS is connected with the main shaft MS by the fourth-gear/reverse hydraulic clutch C4R.

The rotation of the countershaft CS is transmitted through a final drive gear 36 and a final driven gear 38 (which meshes with the gear 34) to a differential D, from where it is transmitted to the driven wheel W, through left and right drive shafts 40, 40.

A throttle position sensor (engine load detecting means) S1 is provided in the air intake pipe (not shown) of the engine E at a point in the vicinity of a throttle valve (not shown) and generates a signal indicative of the degree of throttle valve opening TH. A vehicle speed sensor (vehicle speed detecting means) S2 is provided in the vicinity of the final driven gear 38 and generates a signal indicative of the vehicle traveling speed V from the rotational speed of the final driven gear 38.

An input shaft rotational speed sensor S3 is provided in the vicinity of the main shaft MS and generates a signal indicative of the rotational speed NM of the transmission input shaft from the rotation of the main shaft MS. An output shaft rotational speed sensor S4 is provided in the vicinity of the countershaft CS and generates a signal indicative of the rotational speed NC of the transmission output shaft from the rotation of the countershaft CS.

A shift lever position sensor S5 is provided in the vicinity of a shift lever 44 installed on the vehicle floor near the driver's seat and generates a signal indicating which of the seven positions P, R, N, D4, D3, 2 and 1 is selected by the driver.

A crankshaft sensor S6 is provided in the vicinity of the crankshaft 10 of the engine E and generates a signal indicative of the engine speed NE from the rotation of the crankshaft 10. A coolant temperature sensor S7 is provided at an appropriate location in the cylinder block and generates a signal indicative of the engine coolant temperature Tw.

A brake switch S8 is provided in the vicinity of a brake pedal (not shown) and generates a signal indicating whether the brake is in operation. An oil temperature sensor S9 is provided at an appropriate location of the transmission T and generates a signal indicative of the oil temperature, i.e., the temperature of Automatic Transmission Fluid.

The outputs of the sensors S1, etc., are sent to an ECU (electronic control unit).

The ECU is constituted as a microcomputer comprising a CPU (central processing unit) 50, a ROM (read-only memory) 52, a RAM (random access memory) 54, an input circuit 56 and an output circuit 58. The outputs of the sensors S1, etc., are input to the microcomputer from the input circuit 56. The CPU 50 of the microcomputer controls shifting and the operation of the lockup clutch L of the torque converter 12.

The ECU is connected to a hydraulic control circuit O, which includes magnetic solenoid valves SL1, SL2 for switching the shift valves (not shown) to effect gearshift, a magnetic solenoid valve SL3 for turning on/off the lockup clutch and a magnetic solenoid valve SL4 for regulating lockup clutch engagement, and a magnetic solenoid valve SL5 for regulating the pressure applied to the hydraulic clutches.

The ECU determines and supplies command values to the hydraulic control circuit O through the output circuit 58. More specifically, the CPU 50 determines the gear (gear ratio) to be shifted to and energizes/deenergizes the solenoid valves SL1, SL2 of the hydraulic circuit O via the output circuit 58 so as to switch shift valves and thereby shift gears, and regulates the pressure applied to the hydraulic clutches via the solenoid control valve SL5. It also controls the on/off operation of the lockup clutch L of the torque converter 12 through the solenoid valve SL3 and controls the capacity of the lockup clutch through the solenoid valve SL4.

Moreover, this system is equipped with a navigation system 70. The navigation system 70 has a CPU 72, a CD-ROM 74 which stores the navigation information including the road map of places where the vehicle 1 is expected to travel, the directional information on the road map and the other information such as whether the places are mountain roads or town roads, etc., and a GPS (Global Positioning System) receiver 78 which receives the signal from the GPS satellite position system through an antenna 76. The navigation information is relatively small in volume and does not include the grade of road, etc. The navigation system 70 detects the instantaneous position of the vehicle 1.

The CPU 50 of the ECU is connected with the CPU 72 of the navigation system 70 bi-directionally such that the CPU 50 inputs the aforesaid navigation information through the CPU 72 of the navigation system 70 and conducts a cooperative control (referred hereinafter as "cooperative shift control with navigation").

The operation of the system will be explained.

For ease of understanding, the aforesaid shift control proposed in Japanese Laid-Open Patent Application No. Hei 5 (1993)-71625 on which the control according to the present invention is based, will be explained with reference to the flow chart shown in FIG. 2. The program shown there is executed once every 20 msec.

Figure 2:
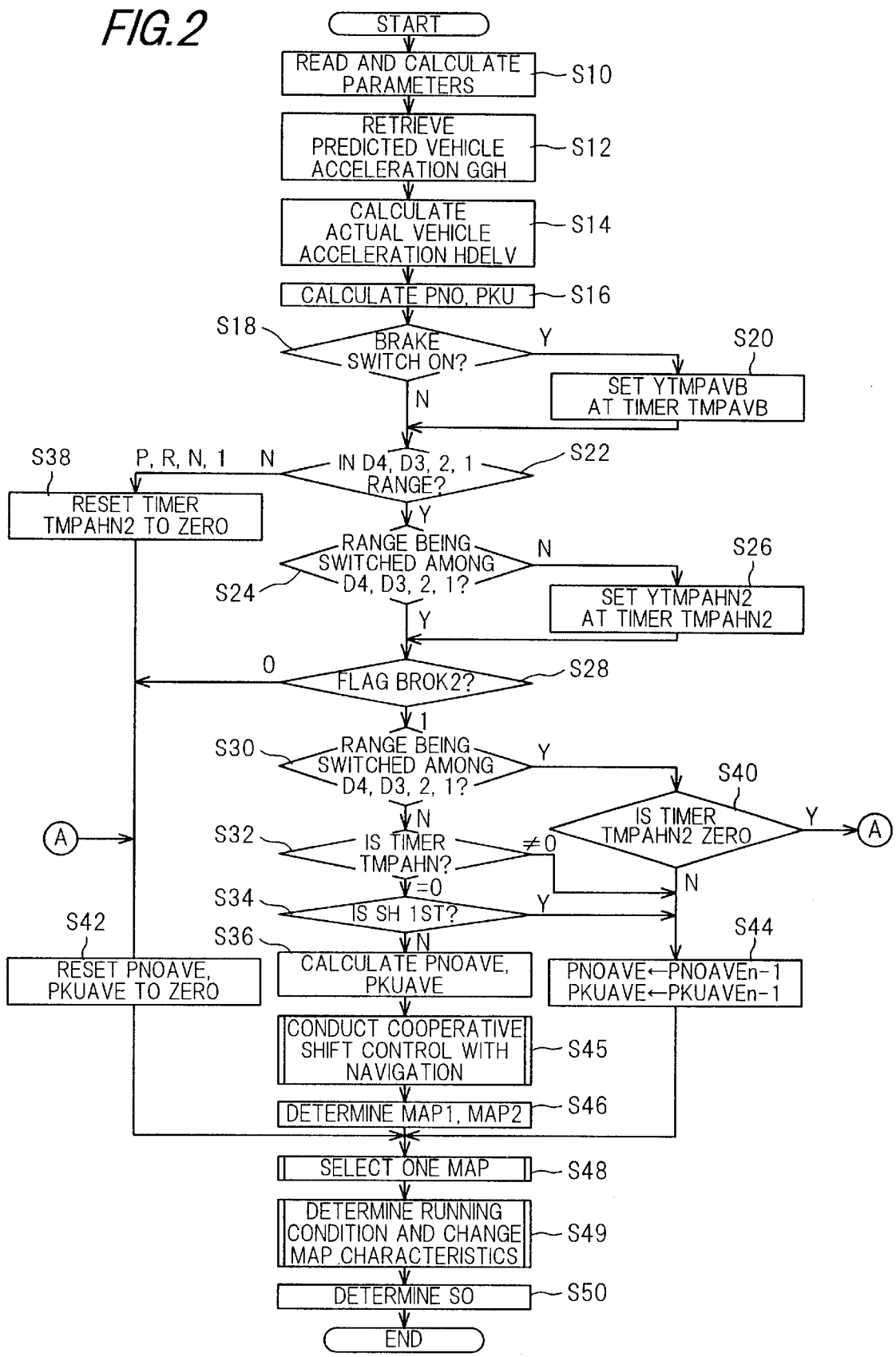
FIG. 2 is a flow chart showing the operation of the system illustrated in FIG. 1.
Figure 3:
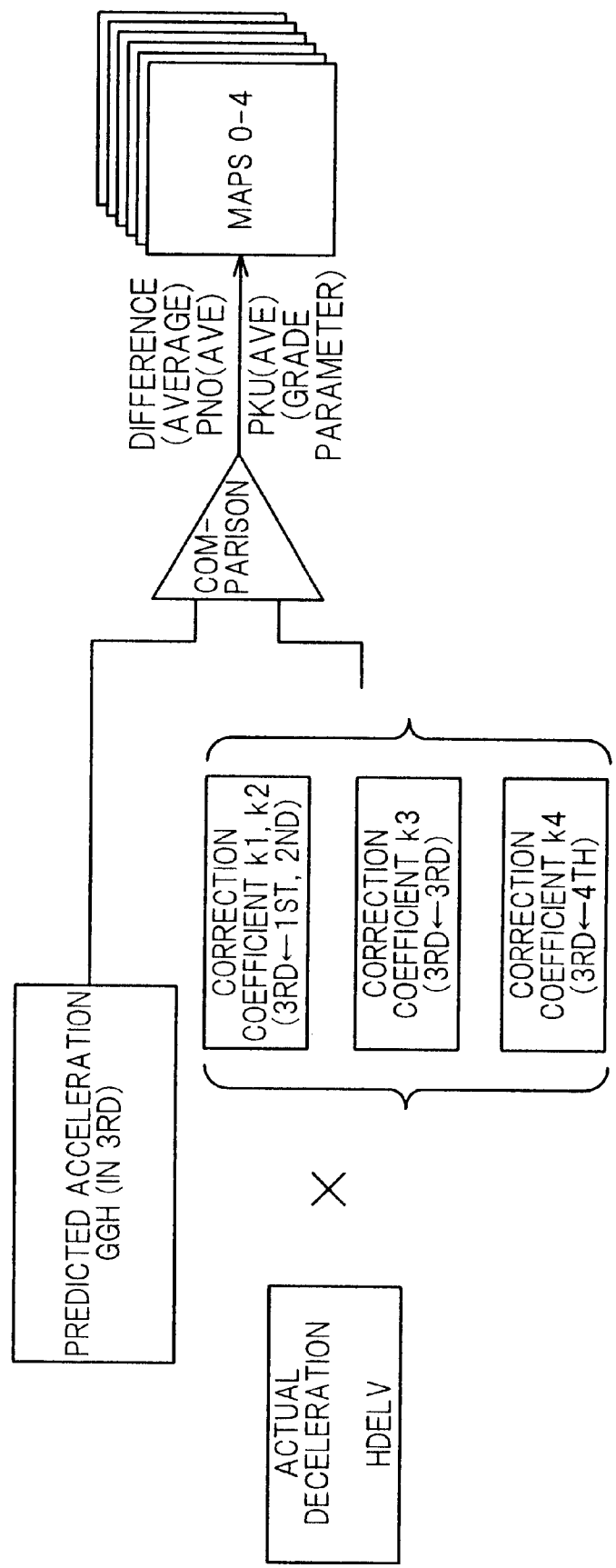
FIG. 3 is an explanatory view showing selection of five maps based on the average value indicative of a grade parameter between the predicted acceleration and the actual acceleration referred to in the flow chart of FIG. 2, on which the invention is based.

Giving an outline of the procedures shown in FIG. 2, as illustrated in FIG. 3, a predicted vehicle acceleration (named GGH) which the vehicle would have during running on a level road at 3rd gear, is prepared in advance as mapped data to be retrieved by at least the vehicle speed V and the throttle opening (engine load) TH. Actual vehicle acceleration (named HDELV) which the vehicle actually generates is calculated based on the first-order difference of the vehicle speed V. Then a correction coefficient kn is retrieved from mapped data that has been determined beforehand using the vehicle speed V and the throttle opening TH. The calculated actual vehicle acceleration is multiplied by the correction coefficient and is corrected to a value estimated to be the actual vehicle acceleration at the 3rd-gear-running.

Then the difference (named PNO or PKU) between the actual vehicle acceleration HDELV and the predicted vehicle acceleration GGH is calculated as PNO=GGH–

HDELV and PKU=HDELV−GGH. When PNO is a positive value, it means that the vehicle runs on an upgrade road (i.e., climbing a hill). On the other hand, when PKU is a positive value, it means that the vehicle runs on a downgrade road (i.e., descending a hill). If PNO or PKU is a small positive value, it means that the vehicle runs on a level road. Then, the difference PNO or PKU is averaged to determine a parameter indicative of the grade of road on which the vehicle runs, more specifically an upgrade parameter PNOAVE or a downgrade parameter PKUAVE. One from among a plurality of shift programs (maps) is selected based on the determined grade parameter and the gear ratio is determined by retrieving the selected shift program using the vehicle speed V and throttle opening TH. Since the details of the control is described in the publication, the explanation will be made in brief.

In the flow chart, the program begins in S10 in which parameters used in the control including the vehicle speed V, the throttle opening TH are read or calculated. The program then proceeds to S12 in which the predicted vehicle acceleration GGH is calculated. As mentioned above, the predicted vehicle acceleration GGH is prepared in advance as mapped data to be retrieved by the vehicle speed V and the throttle opening TH.

The program proceeds to S14 in which the actual vehicle acceleration HDELV is calculated in the manner mentioned above, and proceeds to S16 in which the difference PNO or PKU between the predicted vehicle acceleration and the actual vehicle acceleration is calculated, to S18 in which it is determined whether the signal output from the brake switch S8 is ON. When the result in S18 is affirmative, the program proceeds to S20 in which a brake timer (down-counter) TMPAVB is set with a predetermined value YTMPAVB and is started to count down. Thus, the timer measures the time lapse since the brake pedal is released. This is because the braking force will not become zero immediately after the pedal was released. The corresponding value of YTMPAVE is set on the counter and braking is assumed to be continued until a period corresponding to when the value has expired.

Then, the program proceeds to S22 in which it is determined whether the range selected by the vehicle operator is D4, D3, 2 or 1 and therefore needs the upgrade/downgrade shift control. When the result of S22 is affirmative, the program proceeds to S24 in which it is determined whether the range switching among the three ranges is in progress. When the result is negative, the program proceeds to S26 in which another timer (down-counter) TMPAHN2 is set with a predetermined value YTMPAHN2 and starts to measure time lapse to check whether the range switching is functioning properly.

Then, the program proceeds to S28 in which it is determined from the bit of a flag BRKOK2 whether the brake switch signal is 1 or 0. When the bit is 1 and the brake switch signal is determined to be normal, the program proceeds to S30 in which it is again determined whether the switching among the four ranges is in progress. When the result in S30 is negative, the program proceeds to S32 in which it is determined whether or not a value of a third timer TMPAHN (down counter) has reached zero. This timer is used for determining whether shift is in progress.

When it is determined in S32 that the timer value has reached zero, since this means that no shift is in progress, the program proceeds to S34 in which it is determined whether the gear (gear ratio) currently engaged (named SH) is 1st gear. This determination is made for simplifying calculation, since no downshift is possible in 1st gear.

When the result in S34 is negative, the program proceeds to S36 in which the average value (upgrade/downgrade parameter) PNOAVE or PKUAVE of the difference PNO or PKU is determined by calculating a weighted average value between the current and last differences. Here, PNOAVE corresponds to the grade parameter, more specifically to the upgrade parameter, while PKUAVE corresponds to the grade parameter, more specifically the downgrade parameter. They are generally called grade parameter and individually called upgrade parameter or downgrade parameter.

On the other hand, when the result in S22 is negative, the program proceeds to S38 in which the timer TMPAHN2 is reset to zero, and to S42 in which the average value of the difference (upgrade/downgrade parameter) is made zero. The same procedures will be taken when S28 finds that the brake switch signal is not normal.

When S30 finds that the range switching is in progress, the program proceeds to S40 in which it is determined whether the timer value TMPAHN2 has reached zero. Since this means that the range switching continues for a long period, it can be considered that a failure such as a wire breaking has occurred in the shift lever position sensor S5. As a result, the program proceeds to S42 in which the average value of the difference (upgrade/down grade parameter) is made zero. When the result in S40 is negative, the program proceeds to S44 in which the average value of the difference is held to the value at the preceding cycle (n−1).

When S32 determines that shift is in progress, since it is not possible to determine a gear (gear ratio) to be shifted to and it is difficult to accurately determine the actual vehicle acceleration, the program proceeds to S44. This is the same when the result in S34 is affirmative.

The program then proceeds to S45 in which a cooperative shift control with the navigation information outputted from the navigation system 70 is conducted. This will be explained later.

The program then proceeds to S46 in which the smallest possible map number (MAP1) and the largest possible map number (MAP2) are determined. In this control, as mentioned above, a plurality of maps (shift programs), more specifically, five maps comprising a steep-upgrade map, a slight-upgrade map, a level-road map, a slight-downgrade map and a steep-downgrade map are prepared beforehand as illustrated in FIG. 4. They are identified by numbers from 0 to 4. In addition, another map (shift program) named "corner-sport map" is prepared beforehand to be used in a cooperative shift control (explained later) conducted when the vehicle runs on a downgrade road with corners.

The procedure in S46 is to compare the average value of the difference (grade parameter) PNOAVE or PKUAVE (or PKUAVE2) with reference values PNOnm, PKUnm illustrated in FIGS. 4 and 5 and to determine the smallest possible map in number (MAP1) and the largest possible map in number (MAP2).

Figure 6:
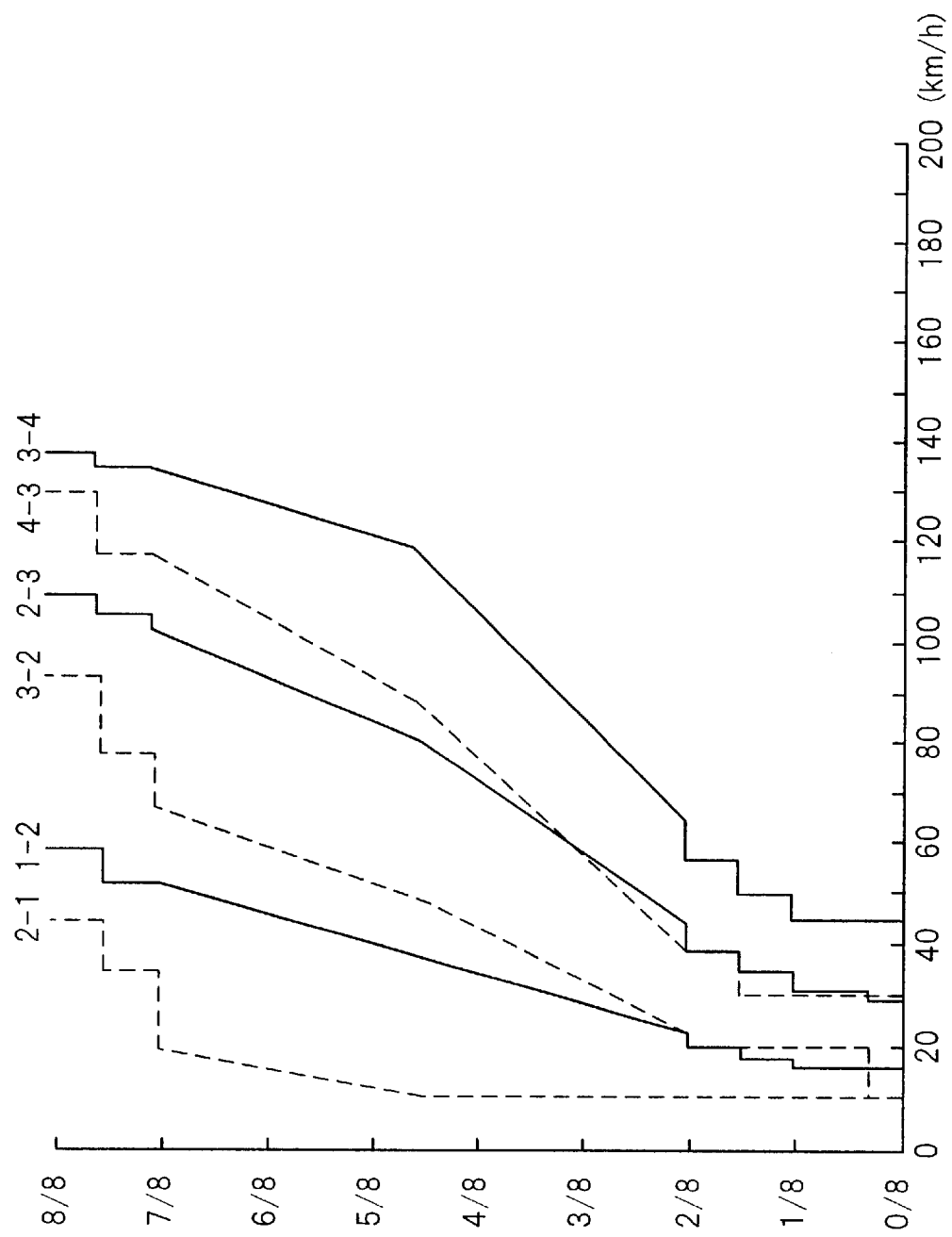
FIG. 6 is an explanatory graph showing a level-road map (shift program) among of the five maps illustrated in FIGS. 3 to 5.
Figure 7:
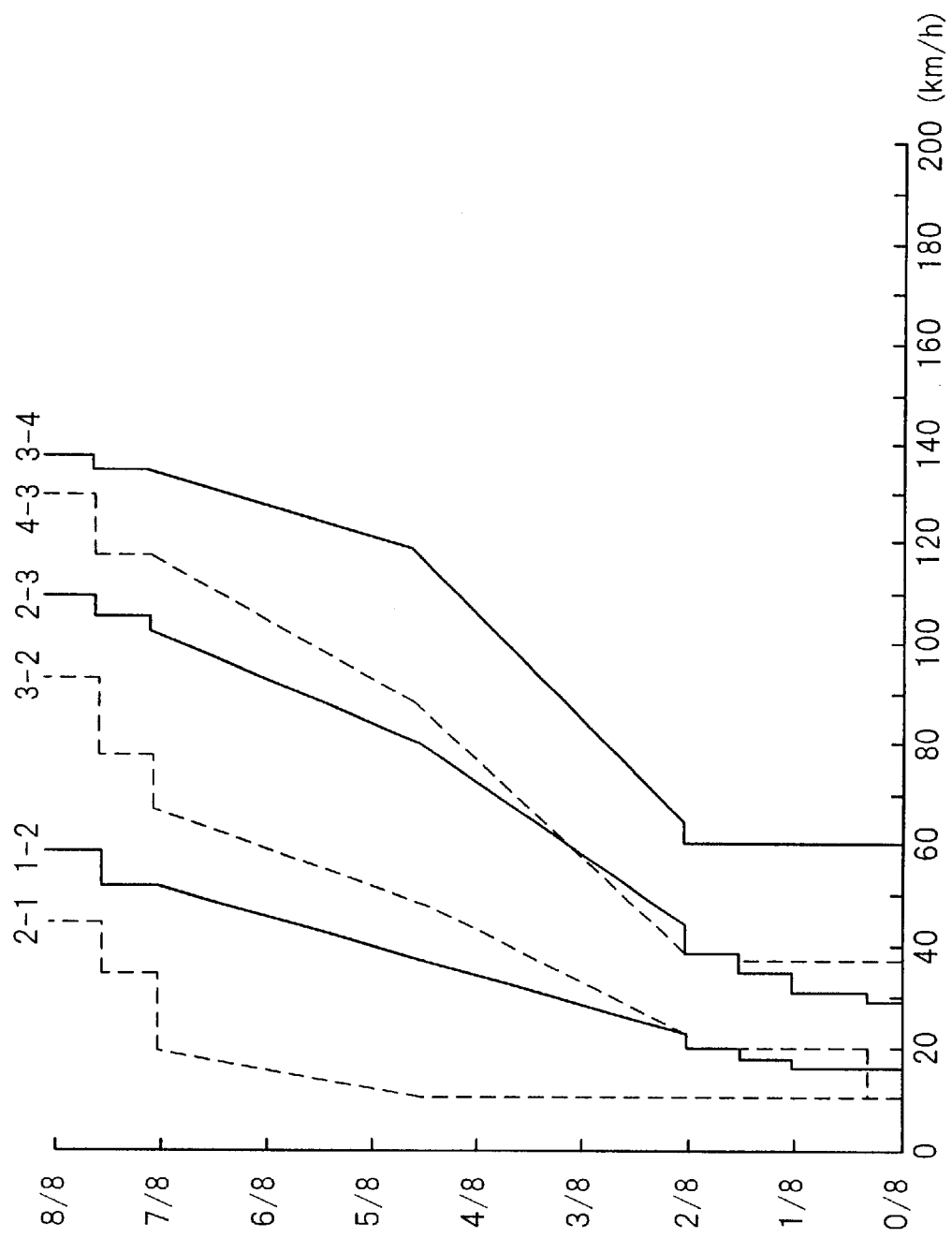
FIG. 7 is an explanatory graph showing a slight-upgrade (downgrade) map (shift program) among of the five maps illustrated in FIGS. 3 to 5.
Figure 8:
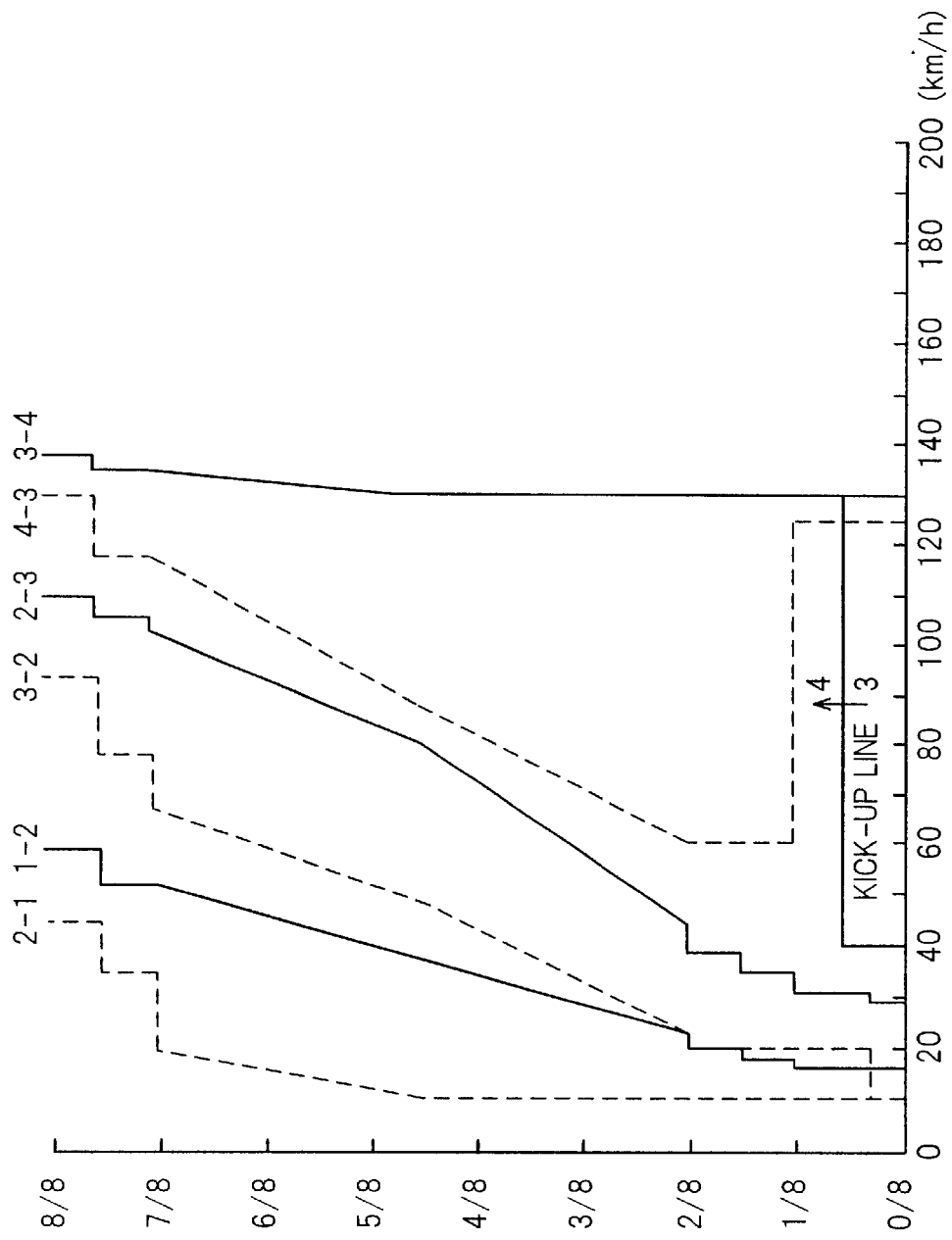
FIG. 8 is an explanatory graph showing a steep-upgrade map (shift program) among of the five maps illustrated in FIGS. 3 to 5.
Figure 9:
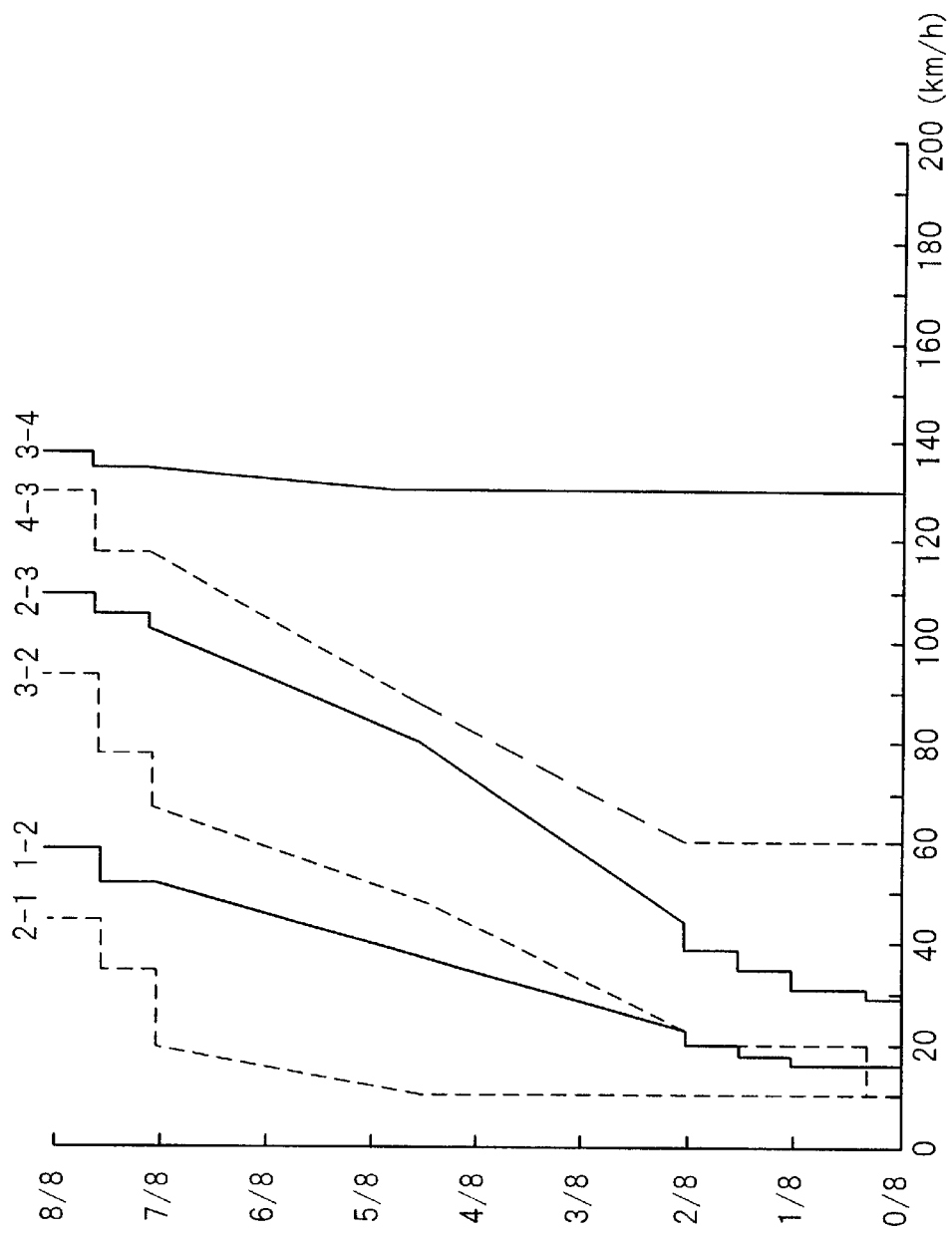
FIG. 9 is an explanatory graph showing a corner-sport map (shift program) used in addition to the five maps illustrated in FIGS. 3 to 5.

FIG. 6 illustrates the characteristics of the level-road map; FIG. 7 illustrates the slight-upgrade (or slight-downgrade) map; FIG. 8 illustrates the steep-downgrade map; and FIG. 9 illustrates the corner-sport map. (The characteristics of the slight-upgrade map and the slight-downgrade map are the same.)

As shown, these characteristics of these maps are different in setting the 3rd-gear region. Specifically, the slight-upgrade (downgrade) map 3rd-gear region is broadened at the small throttle opening area compared to that of the level-road map. The steep-downgrade map 3rd-gear region is broadened at the medium and large throttle opening areas compared to that of the slight-upgrade (downgrade) map. (The steep-downgrade map 3rd-gear region is decreased at the small opening area for facilitating upshift.)

Returning to the explanation of the flow chart of FIG. 2, the program proceeds to S48 in which one map is selected (determined) based on the smallest possible map (MAP1) and the largest possible map (MAP2).

Figure 10:
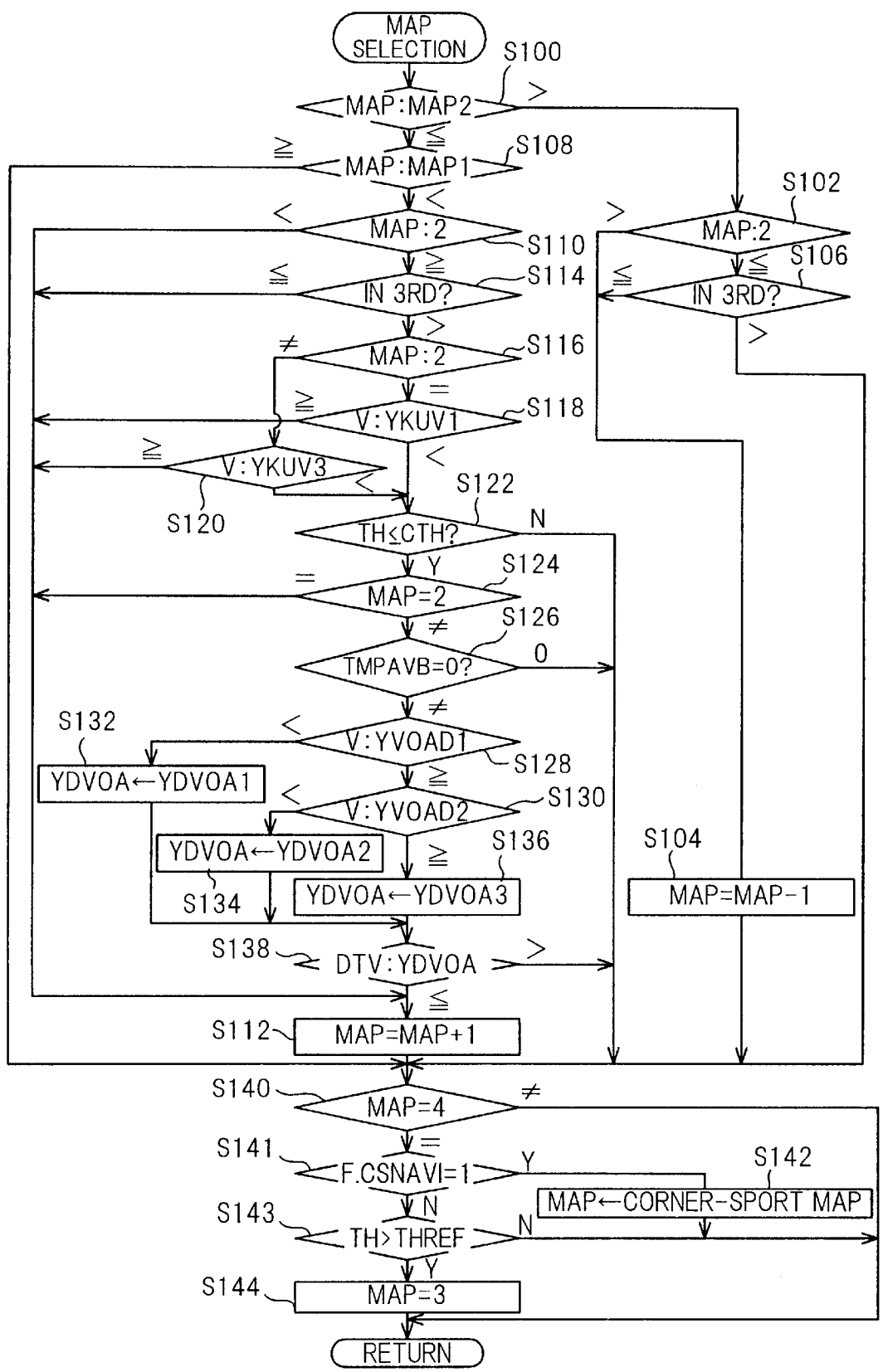
FIG. 10 is a flow chart showing the subroutine of map selection (determination) referred to in the flow chart of FIG. 2.

FIG. 10 is a flow chart showing the subroutine for this selection. The selection is conducted based on the map number assigned to each map.

Explaining the flow chart, the program begins in S100 in which the currently selected map number (MAP) and MAP2 (the largest possible map number) are compared with each other. Logically, it suffices that the largest possible map number≧the selected map number≧the smallest possible map number.

Therefore, when S100 finds that the current map number is greater than the largest possible map number, then the number of the map currently selected must be one of 1, 2, 3 and 4, (it cannot be 0). The program then proceeds to S102 in which it is determined whether the current map number is 2 (level-road map).

If it is determined in S102 that the current map number is greater than 2, since this indicates that the map number currently selected is 3 or 4 (downgrade maps), the program proceeds to S104 in which the number of the map to be selected is determined to be that obtained by subtracting 1 from the current map number.

On the other hand, when it is determined in S102 that the current map number is less than or equal to 2 (level road map) this indicates the map currently selected is number 2 or 1, and this also means that the map will switch from the levelroad map to the slight-upgrade map or from the slight-upgrade map to the steep-upgrade map. In this case, since the 3rd-gear region is different for different maps, if the map switching is conducted when the current gear is 4th, the gear could immediately shift down to 3rd. This is not likely to be what the vehicle operator expects and is thus undesirable.

For avoiding this, the program proceeds to S106 in which it is determined whether the current gear is less than or equal to 3rd, and when it is determined that the current gear is less than or equal to 3rd, the program proceeds to S104 in which the map is switched from the level-road map to the slight-upgrade map, or from the slight-upgrade map to the steep-upgrade map. Thus, map switching is suspended when the current gear is 4th.

When S100 finds that the current map number is less than or equal to the largest possible map number, since this means that the upper limit condition is met, the program proceeds to S108 in which a determination is next made regarding the lower limit condition. Specifically, the current map number (MAP) is compared with the smallest possible map number (MAP1) and if the current map number is found to be greater or equal to the smallest possible map number (MAP1), since the aforesaid logical relationship is met then the map is not changed.

When it is determined in S108 that the current map number is less than the smallest possible map number, this means that the current map number is 0, 1, 2 or 3 (it can not be 4) and since it becomes necessary to switch to a map number greater or equal to the smallest possible map number, the program proceeds to S110 in which the current map number (MAP) is compared with 2 (the level road map).

If the current map number is found to be less than 2 (the level-road map), since this means that the map number to be selected is 1 or 2, the program proceeds to S112 in which 1 is added to the number of the current map to correct the same. Accordingly, if the slight-upgrade map is currently in use, it will be switched to the level-road map, and if the steep-upgrade map is currently in use, it will be switched to the slight-upgrade map.

If S110 finds that the current map number is greater or equal to 2 (the level road map), this means that the current map number is 2 or 3. However, increasing from 2 or 3 could lead to the problem regarding the broadening of the 3rd-gear region.

Accordingly, the program proceeds to S114 in which it is determined whether the current gear is less than or equal to 3rd and when the result is affirmative, since this indicates that no unexpected downshift will occur, the program proceeds to S112 in which map switching is carried out immediately. On the other hand, if the current gear is determined to be 4th, the program proceeds to S116 in which the current map number (MAP) is again compared with 2 (the level road map).

If S116 finds that the current map is the level-road map, the program proceeds to S118 in which the detected vehicle speed V is compared with a prescribed value YKUV1. If it is determined that the current map is not the level-road map, i.e., if it is determined that current map is the slight-downgrade map, the program proceeds to S120 in which the detected vehicle speed V is compared with another prescribed value YKUV3. If the vehicle speed is found to be greater or equal to the prescribed value in either of S118 or S120 the program jumps to S112 and map switching is carried out. These procedures are for preventing the vehicle operator from experiencing an unexpected downshift.

When the vehicle speed is determined to be less than the prescribed value in either of S118 or S120, the program proceeds to S122 in which it is determined whether the detected throttle opening TH is less than or equal to a prescribed value at or near the full-closed throttle opening CTH. If the result is negative, since this means that the accelerator pedal is being depressed and the accelerator pedal is being depressed in 4th gear, the program skips S112 to avoid map switching so as to prevent the downshift from happening.

On the other hand, when the result in S122 is affirmative, since this means that the accelerator pedal is not being depressed and implies that the vehicle operator wants to decelerate, the program proceeds to S124 in which it is again determined whether the current map is the level-road map. When the result is affirmative, the program proceeds to S112 in which the map is changed.

On the other hand, when the result in S124 is negative, since this indicates that the current map is the slight-downgrade map, the program proceeds to S126 in which it is determined whether or not the brake is being applied and therefore it is discerned whether the vehicle operator, in fact, wants to decelerate. If it is determined that the brake is not being applied, since this can be taken to mean that it is not the vehicle operator's intention to decelerate, the program skips S112 and the map is not changed.

If it is determined that the brake is being applied, the program proceeds to S128 to S136 to select the degree of deceleration data YDVOA, to S138 in which the selected degree of deceleration data YDVOA is compared with the actual degree of deceleration DTV (vehicle speed decrease amount per unit time during braking). When it is determined that the actual degree of deceleration DTV is less than or equal to the selected degree of deceleration data YDVOA, determining that rapid deceleration is in progress, the program proceeds to S112 to conduct map switching.

Specifically, notwithstanding the fact that the vehicle operator has applied braking and intends to decelerate, since the degree of deceleration at downshift increases with increasing vehicle speed, this control is configured such that a greater degree of deceleration due to braking is required for map switching with increasing vehicle speed, while map switching is conducted only when it is determined from the result of comparison that rapid deceleration is intended. When S138 finds that the actual degree of deceleration DTV is greater than the selected degree of deceleration data YDVOA, the program skips S112.

The program then proceeds to S140 in which it is determined whether the determined corrected map is 4 (i.e., the steep-downgrade map), and when the result is negative, the program skips the following steps. On the other hand, when the result in S140 is affirmative, the program proceeds to S141 where it is determined whether the bit of a flag F.CSNAVI (explained later) is 1, and if the result is affirmative, the program proceeds to S142 in which the map is switched to the comer-sport map. This will be referred to later.

When the result in S141 is negative, the program proceeds to S143 in which it is determined whether the detected throttle opening TH is greater or equal to a prescribed throttle opening THREF (e.g., (2/8)×Wide-Open Throttle [degrees]). When the result is negative, the program skips the following steps. When the result is affirmative, on the other hand, the program proceeds to S144 in which the map is forcibly switched to 3 (i.e., the slight-downgrade map).

Conceivably, the fact that the throttle valve is depressed by the amount greater or equal to THREF indicates that the vehicle operator does not want the engine braking effect. Rather, this would mean that the vehicle operator wishes to accelerate. The map is accordingly switched to the slight-downgrade map.

Based on the above, the cooperative shift control with navigation referred to in S45 of the flow chart of FIG. 2 will be explained.

Figure 11:
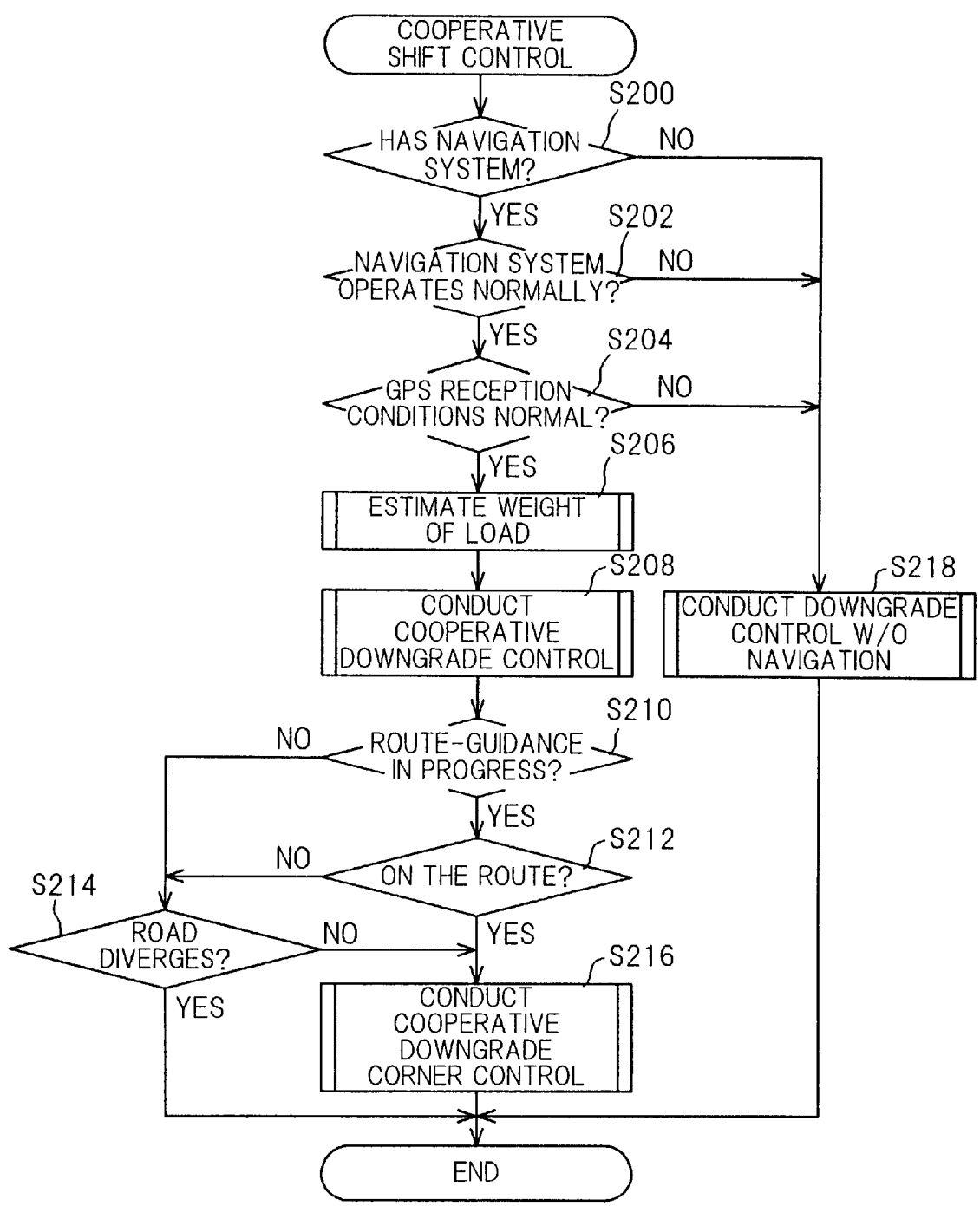
FIG. 11 is a flow chart showing the subroutine of cooperative shift control of the shift control with navigation information referred to in the flow chart of FIG. 2.

FIG. 11 is a flow chart showing the subroutine of the control.

Explaining this flow chart, the program begins in S200 in which it is determined whether the vehicle has, in fact, the navigation system 70. This is done by determining whether the CPU 50 is able to communicate with the CPU 72 of the navigation system 70.

When the result is affirmative, the program proceeds to S202 in which it is determined whether or not the navigation system 70 operates normally. This is done by communicating with the CPU 72 of the navigation system to discern whether the bit of an appropriate flag is set to 1 indicating that a problem has occurred in the navigation system 70.

If it is determined in S202 that a problem has not occurred, the program proceeds to S204 in which it is determined in a similar manner whether reception conditions from the GPS satellite are good. When the result is affirmative, the program proceeds to S206 in which the weight of the load (which the vehicle is carrying) is estimated.

Figure 12:
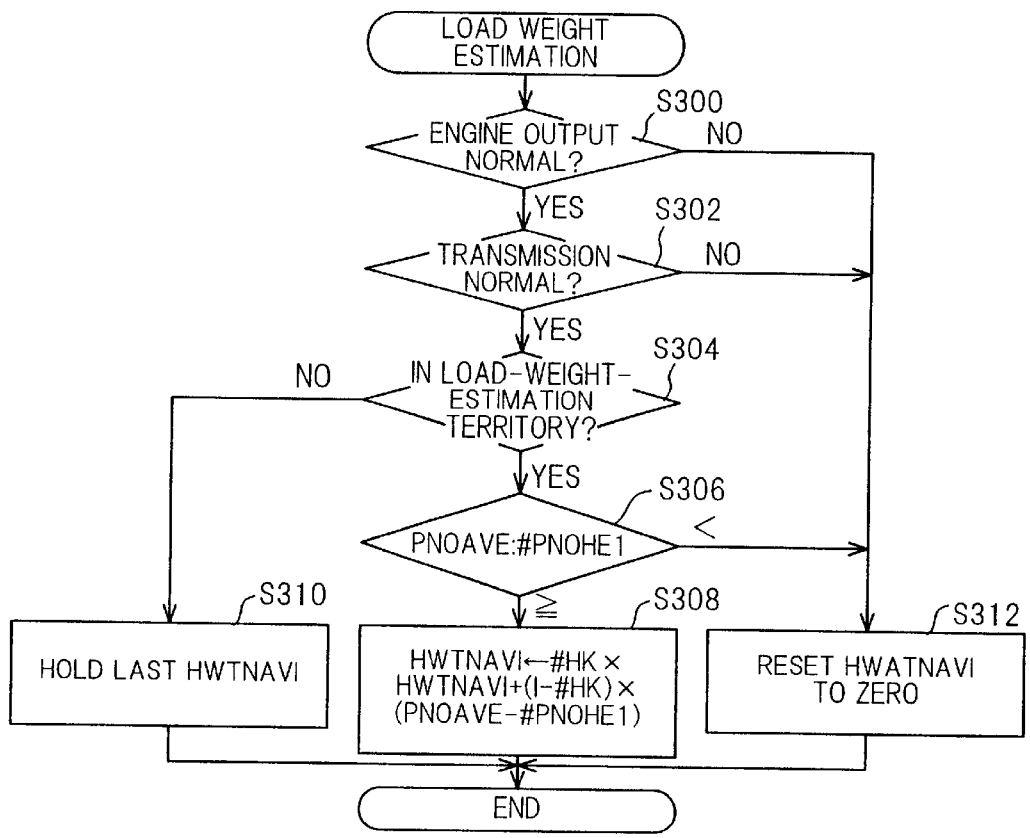
FIG. 12 is a flow chart showing the subroutine of load-weight estimation referred to in the flow chart of FIG. 11.

FIG. 12 is a flow chart showing the estimation of the load weight.

Explaining the flow chart, the program begins in S300 in which it is determined whether the output of the engine E is normal. It is determined that the output of the engine E is normal when the detected coolant temperature is within a predetermined range, the atmospheric pressure (detected by an appropriate means) is greater or equal to a predetermined pressure (i.e., the vehicle is not traveling a place whose altitude is greater or equal to a predetermined altitude), and no ECU flag indicates the occurrence of engine trouble.

When the result in S300 is affirmative, the program proceeds to S302 in which it is determined whether the transmission T operates normal. The operation of transmission T is determined normal when the oil temperature (the temperature of Automatic Transmission Fluid) is within a predetermined range, and no ECU flag indicates the occurrence of transmission trouble. Instead of the provision of the oil temperature sensor S9, the output of the coolant temperature S7 can be used.

When the result in S302 is affirmative, the program proceeds to S304 in which it is determined whether the vehicle runs on a road within a load-weight-estimation territory. This is done by determining from the information of the navigation system 70 whether the vehicle is traveling on a level road (i.e., a road with no climbing resistance) and when the result is YES, it is determined that the vehicle runs on a road within the load-weight-estimation territory.

Figure 13:
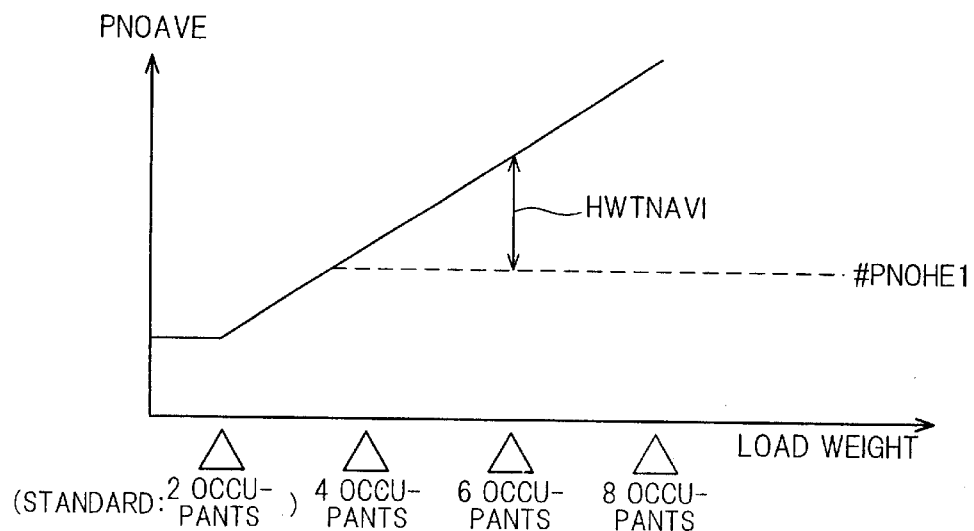
FIG. 13 is an explanatory graph showing the characteristic of a load-weight estimated value HWTNAVI referred to in the flow chart of FIG. 12.

When the result in S304 is affirmative, the program proceeds to S306 in which the aforesaid upgrade parameter PNOVAVE is compared with a threshold value #PNOHE1 (illustrated in FIG. 13). When it is determined that the upgrade parameter PNOAVE is greater or equal to the threshold value #PNOHE1, the program proceeds to S308 in which the threshold value #PNOHE1 is subtracted from the upgrade parameter PNOAVE and the resultant difference is determined as a load-weight estimated value HWTNAVI.

As illustrated, specifically, the load-weight estimated value HWTNAVI is calculated or updated through the learning control by obtaining a weighted average between the difference and HWTNAVI up to that time with the use of a weighting coefficient #HK. Since the weight of the load, more specifically, the number of occupants may vary after the engine is stopped, the calculated learning-control value is not held when the engine is stopped.

The threshold value #PNOHE 1 should be a value indicating the upgrade parameter for the vehicle carrying a standard weight of the load (i.e., two occupants each having 50 kg weight), and is determined beforehand through experimentation. When the upgrade parameter PNOAVE is greater or equal to the threshold value #PNOHE1, since this means that the vehicle acceleration is not generated as expected, in other words, the weight of the load is greater than the standard weight, the load-weight estimated value HWTNAVI is thus calculated in S308 from the difference obtained by subtracting the threshold value #PNOHE1 from the upgrade parameter PNOAVE.

As illustrated in FIG. 13, assuming the weight of the load including two occupants each having 50 kg weight as the standard, the load-weight estimated value HWTNAVI is determined such that it increases with increasing upgrade parameter PNOAVE.

In the flow chart, when the result in S304 is negative, since this means the vehicle runs on an upgrade or downgrade road, the program proceeds to S310 in which the load-weight estimated value HWATNAVI calculated at the preceding cycle, i.e., the value calculated at the last program loop of the FIG. 2 flow chart is held.

When the result in S300 or S302 is negative, the program proceeds to S312 in which the weight of the load is at or near the standard and if the load-weight estimated value HWT- NAVI remains, the value is reset to zero. The same will also be applied when S306 finds that the upgrade parameter PNOAVE is less than the threshold value #PNOHE1.

Returning to the explanation of FIG. 11, the program proceeds to S208 in which a cooperative downgrade control is conducted.

Figure 14:
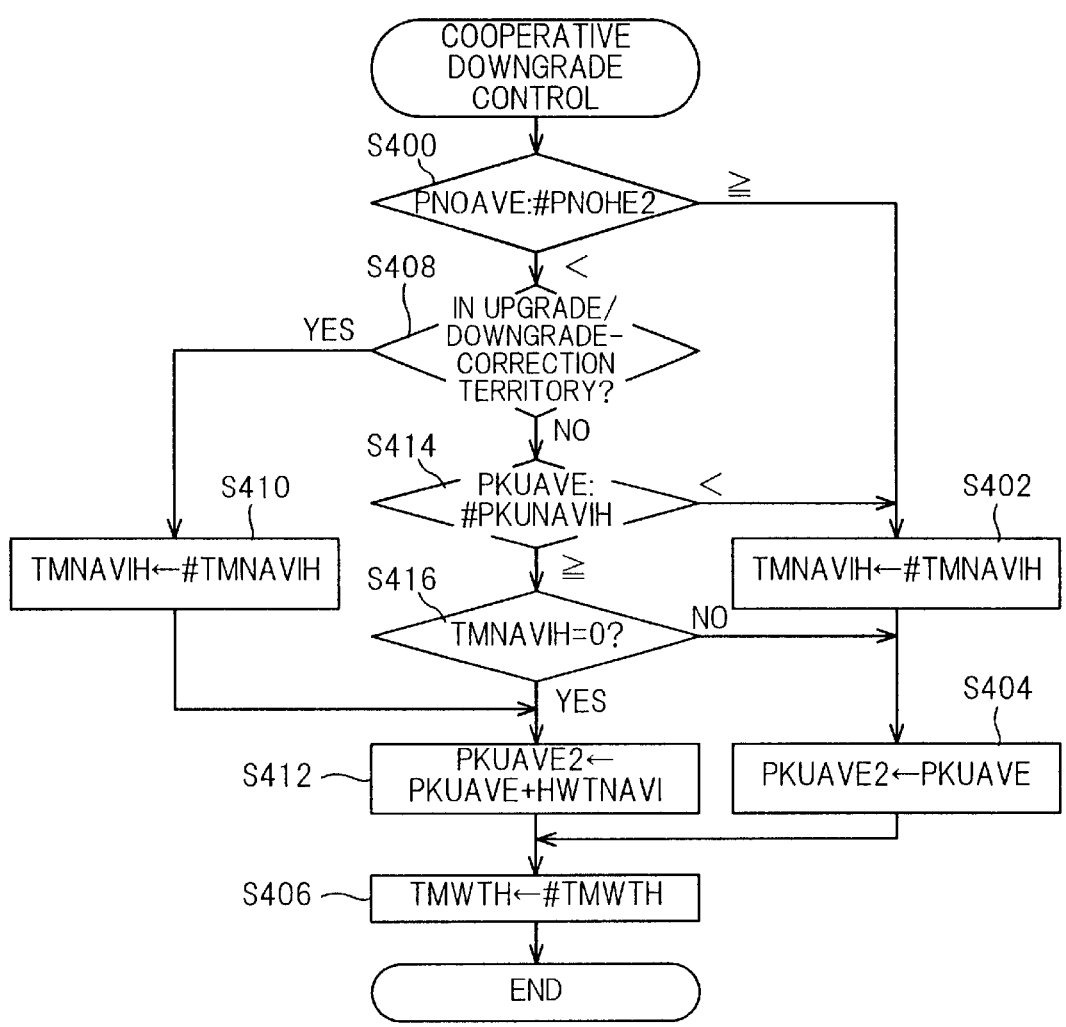
FIG. 14 is a flow chart showing the subroutine of a cooperative downgrade control referred to in the flow chart of FIG. 11.

FIG. 14 is a flow chart showing the subroutine of this control.

The program begins in S400 in which the upgrade parameter PNOAVE is compared with a second threshold value #PNOHE2. The second threshold value #PNOHE2 should be a value indicating that the vehicle runs on an upgrade road and is obtained beforehand through experimentation.

When it is determined in S400 that the upgrade parameter PNOAVE is greater or equal to the second threshold value #PNOHE2, since this means that the vehicle runs on an upgrade road, the program proceeds to S402 in which a timer (down-counter) TMNAVIH is set with a predetermined value #TMNAVIH and is started to count down.

The program then proceeds to S404 in which the downgrade parameter PKUAVE is written as PKUAVE2, to S406 in which a timer (down-counter) TMWTH is set with a predetermined value #TMWTH and is started to count down. This timer will be used in a downgrade control without navigation (explained later).

When it is determined in S400 that the upgrade parameter PNOAVE is less than the second threshold value #PNOHE2, since this means that the vehicle runs on a level road or a downgrade road, the program proceeds to S408 in which the vehicle runs on a road within a upgrade/downgrade-correction territory. This is done by determining from the navigation information whether the vehicle is traveling on an upgrade or downgrade road, more precisely a downgrade road, extending over a relative long distance (e.g., 1 km) such as a mountainous road, and when the result is YES, it is determined that the vehicle runs on a road within the upgrade/downgrade-correction territory.

When the result in S408 is affirmative, the program proceeds to S410 in which the aforesaid timer TMNAVIH is set with the predetermined value #THNAVIH and is started to count down, and to S412 in which the aforesaid load-weight estimated value HWTNAVI is added to the downgrade parameter PKUAVE to correct the same.

On the other hand, when the result in S408 is negative, the program proceeds to S414 in which the downgrade parameter PKUAVE is compared with a third threshold value #PKUNAVIH. The third threshold value #PKUNAVIH should be a value indicating that the vehicle runs on a steep downgrade road greater to or equal to a predetermined downgrade, and is obtained beforehand through experimentation.

When S414 determines that the downgrade parameter PKUAVE is less than the third threshold value #PKUNAVIH, since this means that the vehicle runs on a level road or on a moderate downgrade road, the program proceeds to S402. On the other hand, when S414 determines that the downgrade parameter PKUAVE is greater or equal to the third threshold value #PKUNAVIH, since this means that the vehicle runs on a steep downgrade road, the program proceeds to S416 in which it is determined whether the aforesaid first timer TMNAVIH has reached zero.

When the result in S416 is negative, the program proceeds to S404. On the other hand, when the result in S416 is affirmative, the program proceeds to S412 in which the load-weight estimated value HWTNAVI is added to the downgrade parameter PKUAVE to correct (increase) the same and the corrected value is renamed PKUAVE2.

Figure 15:
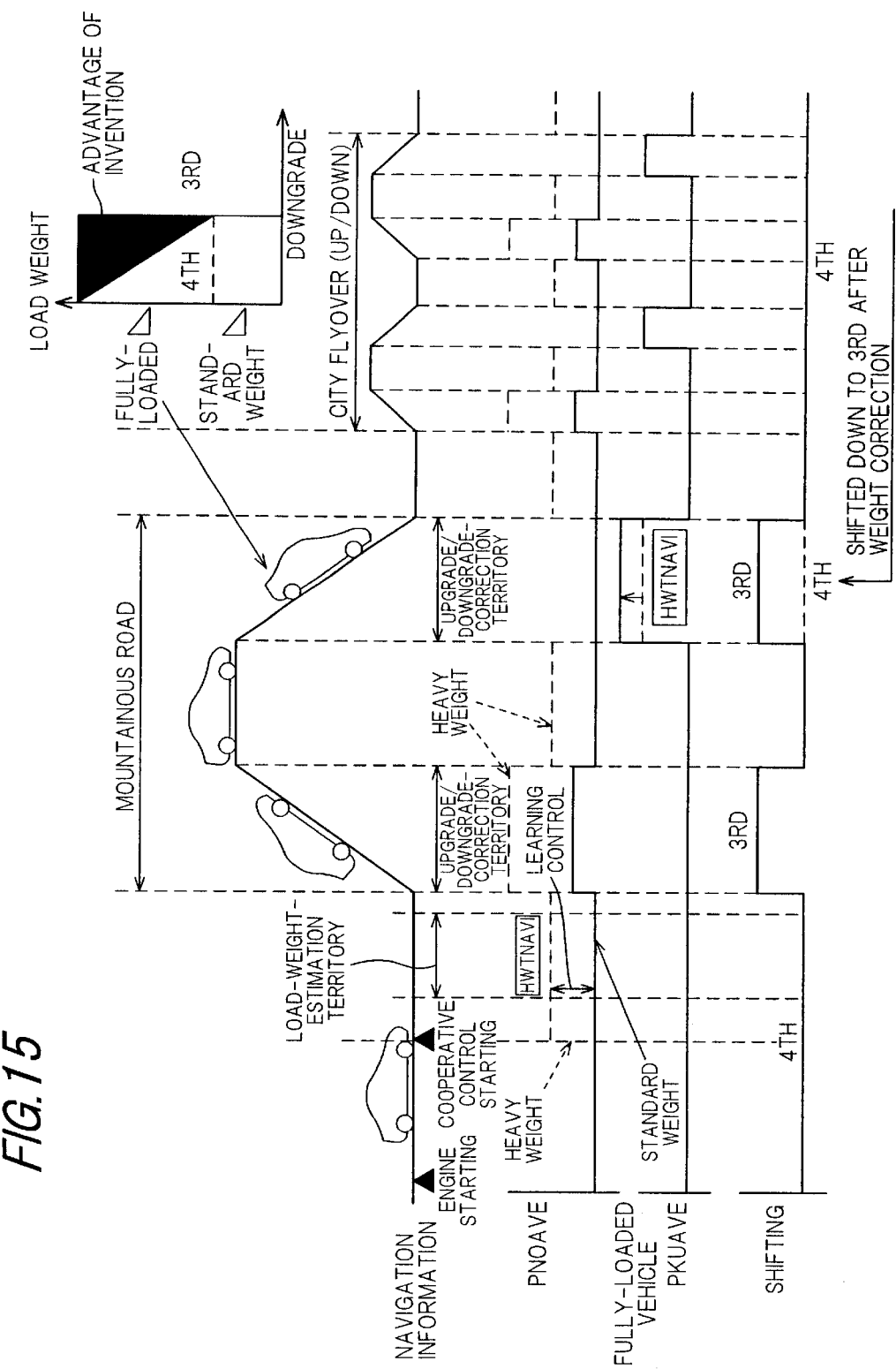
FIG. 15 is a time chart showing the procedures of the flow chart of FIG. 14.

Explaining the procedures shown in FIGS. 12 and 14 with reference to a time chart of FIG. 15, the load-weight estimated value exceeding the standard weight is calculated when it is determined that the vehicle runs on a level road from the navigation information, in other words, when the vehicle is not affected by the climbing resistance.

Then, when it is determined that the vehicle runs on a road within the upgrade/downgrade-correction territory, the downgrade parameter PKUAVE is increased (corrected) by the load-weight estimated value HWTNAVI.

When it is determined that the vehicle runs on a road out of the upgrade/downgrade-correction territory, but it is determined from the downgrade parameter PKUAVE that the vehicle runs on a steep downgrade road, the downgrade parameter PKUAVE is similarly corrected (increased), if the downgrade-running condition continues for the predetermined time #TMNAVIH (which is a value corresponding to 500 m or thereabout in distance).

With this, the downgrade parameter PKUAVE2 will be increased. As a result, as illustrated in FIG. 4, the map is switched from the level-road map to the slight-downgrade map, from the slight-downgrade map to the steep-downgrade map, increasing the likelihood that the 3rd gear will be used such that the motive power intended by the vehicle operator during downgrade is generated.

In particular, when running on a downgrade road, since the engine braking effect is likely to be generated, the vehicle operator's braking is reduced, thereby enhancing the driveability during hill-descending. It should be noted here that PKUAVE2 is treated as the same parameter as PKUAVE in the flow charts of FIG. 2, 10, etc.

Moreover, since the determination as to whether the vehicle runs on a road within the upgrade/downgrade-correction territory, is conducted based on the navigation information, errors such as those which occur when the vehicle encounters a short city flyover etc, will not occur. Even if the navigation information is temporarily invalid, since the downgrade parameter correction is implemented, both the navigation information and the upgrade parameter indicate the same result and this control is not affected by the navigation information.

Furthermore, since the downgrade parameter correction is only carried out when the downgrade-running condition continues for the predetermined time (corresponding to 500 m), no map change will unnecessarily occur over a short distance such as when encountering a flyover in the city. Accordingly, the configuration can avoid unnecessary downshift to 3rd gear as illustrated by dashed lines at the portion mentioned as "CITY FLYOVER (UP/DOWN)" in FIG. 15.

Furthermore, it suffices if the navigation information includes at least the upgrade/downgrade-correction territory, more precisely the information indicating whether the vehicle runs on a mountainous down-grade road or not and the information of road corners or divergences (explained later). The data to be stored in the navigation system 70 is relatively smaller than that in the prior-art system, decreasing the volume of calculation and rendering the system advantageous in cost. Since the grade parameter is corrected and the shift control is effected, the control response is not degraded. Even when the instantaneous position of the vehicle is not detected accurately, the control is not affected by this insufficient detection.

Returning to the explanation of FIG. 11, the program then proceeds to S210 in which it is determined whether route-guidance is in progress. This is done by referring to the navigation system 70 to determine whether the route-guidance mode is selected. When the result is affirmative, the program proceeds to S212 in which it is determined whether the vehicle runs along the guided route. This is done by similarly referring to the navigation system 70.

When the result in S212 is affirmative, the program proceeds to S216 in which the cooperative downgrade corner control is conducted. This will be explained later.

When the result in S212 is negative, the program proceeds to S214 in which it is determined from the navigation information whether the road will diverge ahead. When the result is negative, the program proceeds to S216 in which the cooperative downgrade corner control is conducted. When the result in S214 is affirmative, since it is not sure which way the vehicle operator will take if no route-guidance is in progress, the program skips S216.

Figure 16:
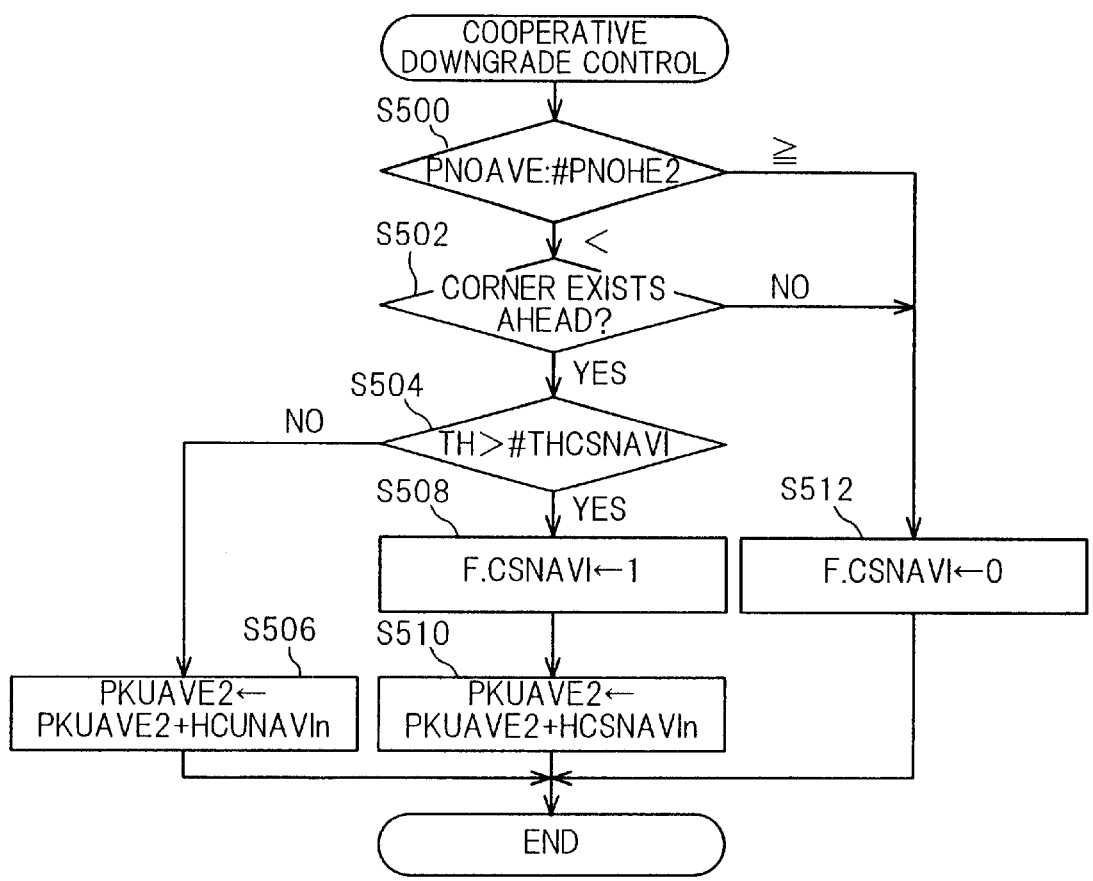
FIG. 16 is a flow chart showing the subroutine of cooperative downgrade corner control referred to in the flow chart of FIG. 11.

FIG. 16 is a flow chart showing the subroutine of the cooperative downgrade corner control.

The program begins in S500 in which the upgrade parameter PNOAVE is again compared with the second threshold value #PNOHE2 and when the upgrade parameter PNOAVE is determined to be less than the second threshold value #PNOHE2, since this means that the vehicle runs on a level road or a downgrade road, the program proceeds to S502 in which it is determined from the navigation information whether the road has a corner (curve) ahead of the vehicle. When the navigation information suggests the existence of corner, the curvature R of the corner is read out.

When the result in S502 is affirmative, the program proceeds to S504 in which it is determined whether the throttle opening TH is greater than a predetermined throttle opening #THCSNAVI. The threshold value #THCSNAVI should be a value indicating that the vehicle operator wants the shift control to be based on the corner-sport map at the corner, and is determined beforehand through experimentation.

When the result in S504 is negative, since this means that the vehicle operator seems not to have such an intention, the program proceeds to S506 in which a predetermined value HCUNAVIn is added to the downgrade parameter PKUAVE to correct (increase) the same. The corrected value is rewritten as PKUAVE2. This leads the map to be changed to the steep-downgrade map or slight-downgrade map. The threshold value HCUNAVIn is not a fixed value, but is set such that it increases with increasing vehicle speed and corner curvature R as illustrated in FIG. 18(*a*) which will be referred to later.

When the result in S504 is affirmative, since this means that the vehicle operator has such an intention, the program proceeds to S508 in which the bit (initial value 0) of a corner-sport-map discrimination flag F.CSNAVI is set to 1. (As a result, the result in S141 is affirmative in the flow chart of FIG. 10 and the program proceeds to S142 in which the corner-sport map is selected). The program then proceeds to S510 in which a second predetermined value HCSNAVIn is added to the downgrade parameter PKUAVE2 to correct (increase) the same.

In this embodiment, as illustrated in FIGS. 4 and 5, the corner-sport map has an equivalent relationship with the steep-downgrade map (map number 4). The embodiment is configured such that, at the situation where the steep-downgrade map can be selected, the corner-sport map is selected if the throttle opening TH is greater than the aforesaid prescribed value #THCSNAVI, while the steep-downgrade map is selected if the throttle opening TH is not greater than the aforesaid prescribed #THCSNAVI.

Figure 17:
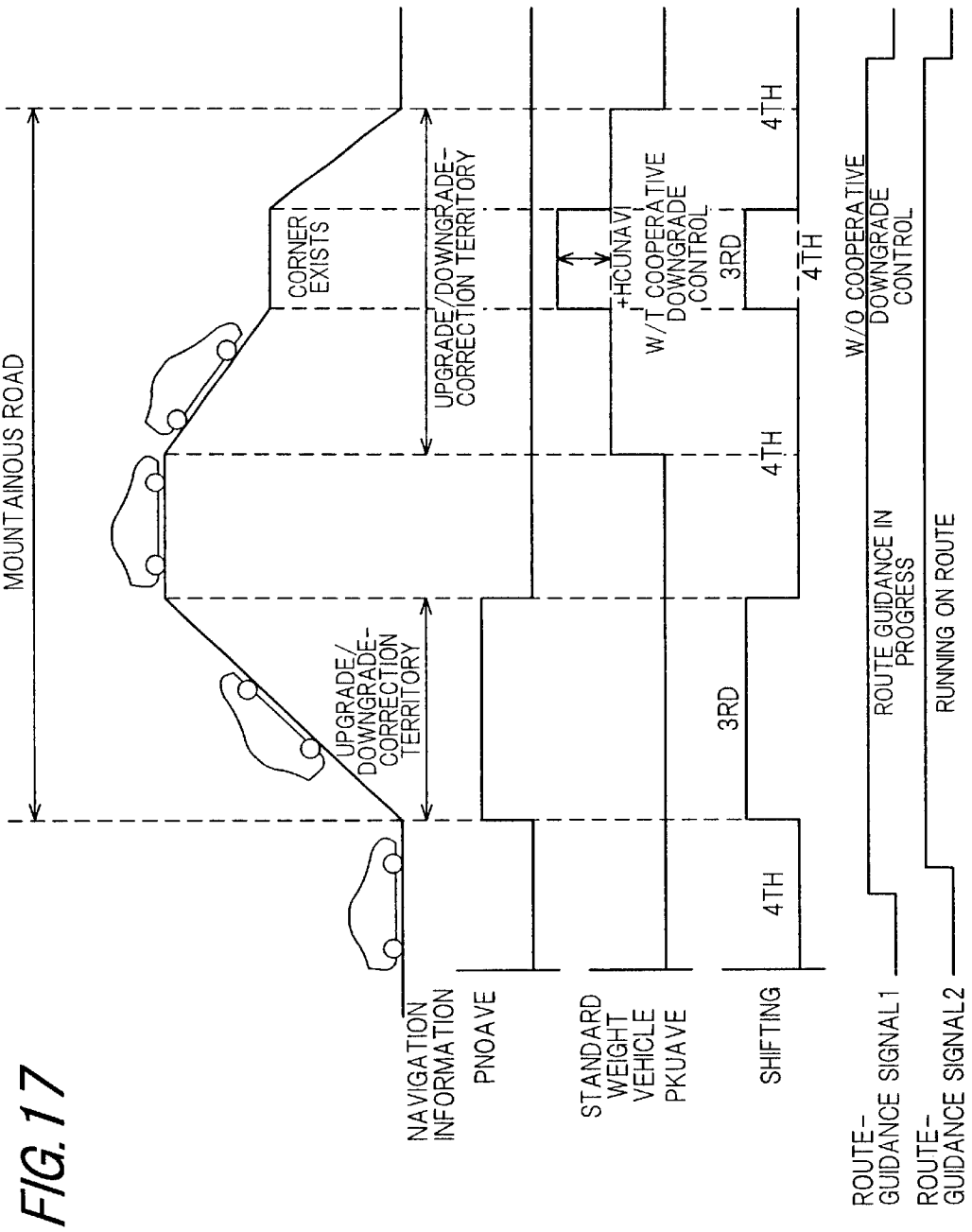
FIG. 17 is a time chart showing the procedures of the flow chart of FIG. 16.

As illustrated in FIG. 9, since the 3rd-gear region of the corner-sport map is broadened compared to that of the steep-downgrade map, 3rd gear is used when the vehicle runs along the downgrade corner as illustrated in FIG. 17, effecting the shift control desired by the vehicle operator.

Similar to the aforesaid predetermined value HCUNAVIn, the predetermined value HCSNAVIn is set such that it increases with increasing vehicle speed and it also increases with increasing curvature of corner R as illustrated in FIG. 18(*b*).

With this, 3rd gear is more likely to be used as the curvature of the corner increases, enabling to sufficiently respond to the vehicle operator's desire to increase the motive force and enhancing the driveability. This will be the same when the vehicle runs to the divergence road. As shown at the bottom of FIG. 17 and FIGS. 18(*c*)(*d*), but for this control, the gear would be shifted to 4th, failing to match the vehicle operator's expectation sufficiently. Although the control is explained regarding 3rd and 4th gears in this embodiment, the control should not necessarily be limited to the description. The control will be applied from 1st to 3rd gears appropriately based on the vehicle speed, the curvature of corner and the throttle opening. In that case, since it suffices if the characteristics shown in FIG. 18(*a*) are modified in response thereto, no detailed explanation will be needed.

Returning to the explanation of FIG. 16, when S500 finds that the upgrade parameter PNOAVE is greater or equal to the threshold value #PNOHE2, since this means that the vehicle runs on an upgrade road, the program proceeds to S512 in which the bit of the aforesaid flag is reset to 0. The same will also be applied when the result in S502 is negative.

Returning to the explanation of FIG. 11, when the result in any of S200 to S204 is negative, since the navigation information is not usable, the program proceeds to S218 in which the downgrade control is conducted without using the navigation information. This is the aforesaid downgrade control without navigation information.

Figure 19:
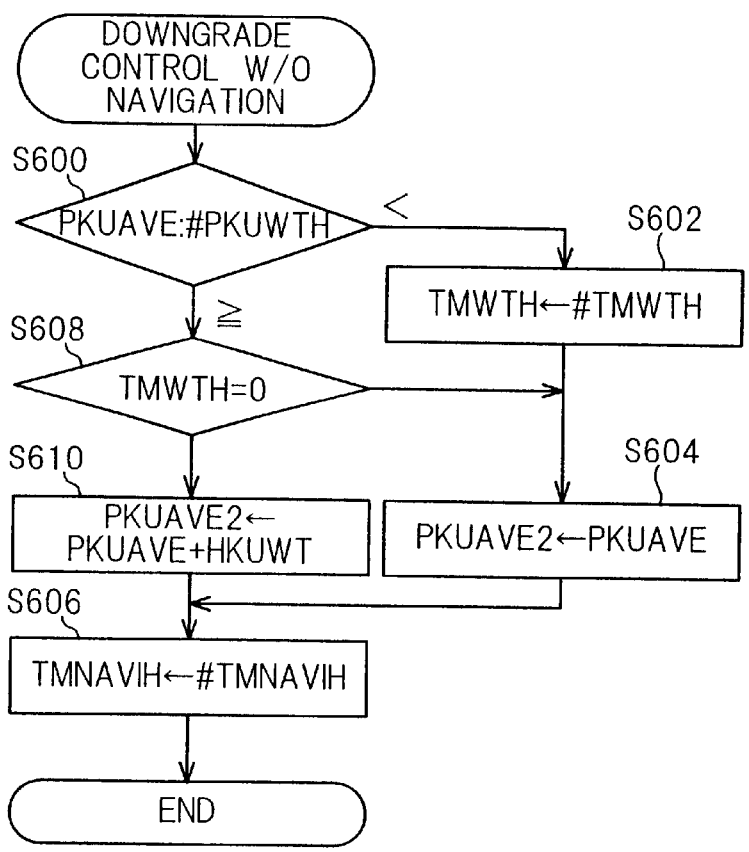
FIG. 19 is a flow chart showing the subroutine of downgrade control without navigation information referred to in the flow chart of FIG. 11.

FIG. 19 is a flow chart showing the subroutine of this control.

The program begins in S600 in which the downgrade parameter PKUAVE is compared with a predetermined value #PKUWTH. The predetermined value is a threshold value for discriminating whether the vehicle runs on a road which requires conducting the downgrade control without navigation information, and is obtained beforehand through experimentation.

When it is determined in S600 that the downgrade parameter PKUVAVE is less than the predetermined value #PKUWTH, since this means the vehicle runs on a level road or an upgrade road, the program proceeds to S602 in which the aforesaid timer (down-counter) is set with the aforesaid predetermined value #TMWTH and is started to measure time lapse, and to S604 in which the downgrade parameter PKUAVE is rewritten as PKUAVE2.

The program then proceeds to S606 in which the aforesaid timer TMNAVIH is set with the predetermined value #TMNAVIH and is started to measure time lapse.

On the other hand, when it is determined in S600 that the downgrade parameter PKUAVE is greater or equal to the predetermined value #PKUWTH, since this means the vehicle runs on a downgrade road, the program proceeds to S608 in which it is determined whether the value of timer TMWTH has reached zero and when the result is negative, the program proceeds to S604.

When the result in S608 is affirmative in the next or later program loop, the program proceeds to S610 in which a predetermined value HKUWT is added to the downgrade parameter PKUAVE to correct (increase) the same, and the corrected value is rewritten as PKUAVE2.

Figure 20:
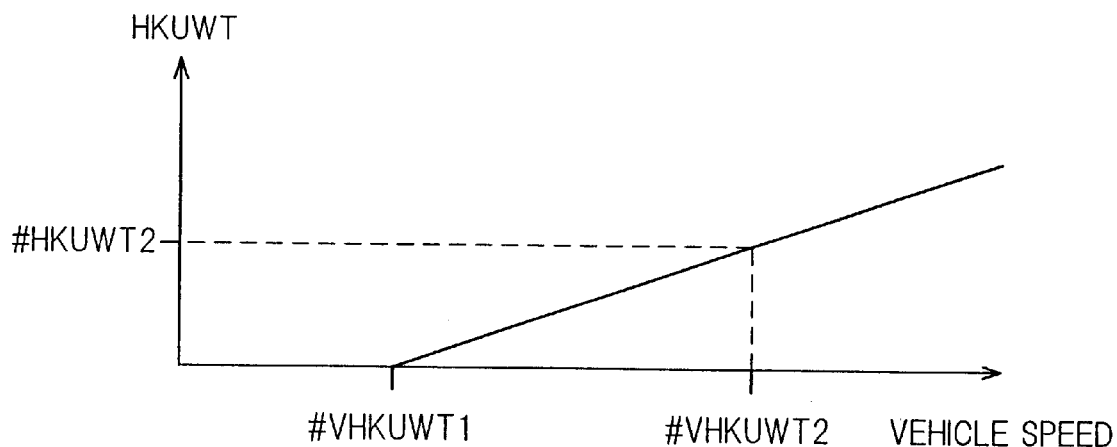
FIG. 20 is an explanatory graph showing the characteristic of a value referred to in the flow chart of FIG. 19.

FIG. 20 is an explanatory graph showing the table characteristic of the predetermined value HKUWT. As illustrated, the predetermined value HKUWT is set such that it increases with increasing vehicle speed.

Figure 21:
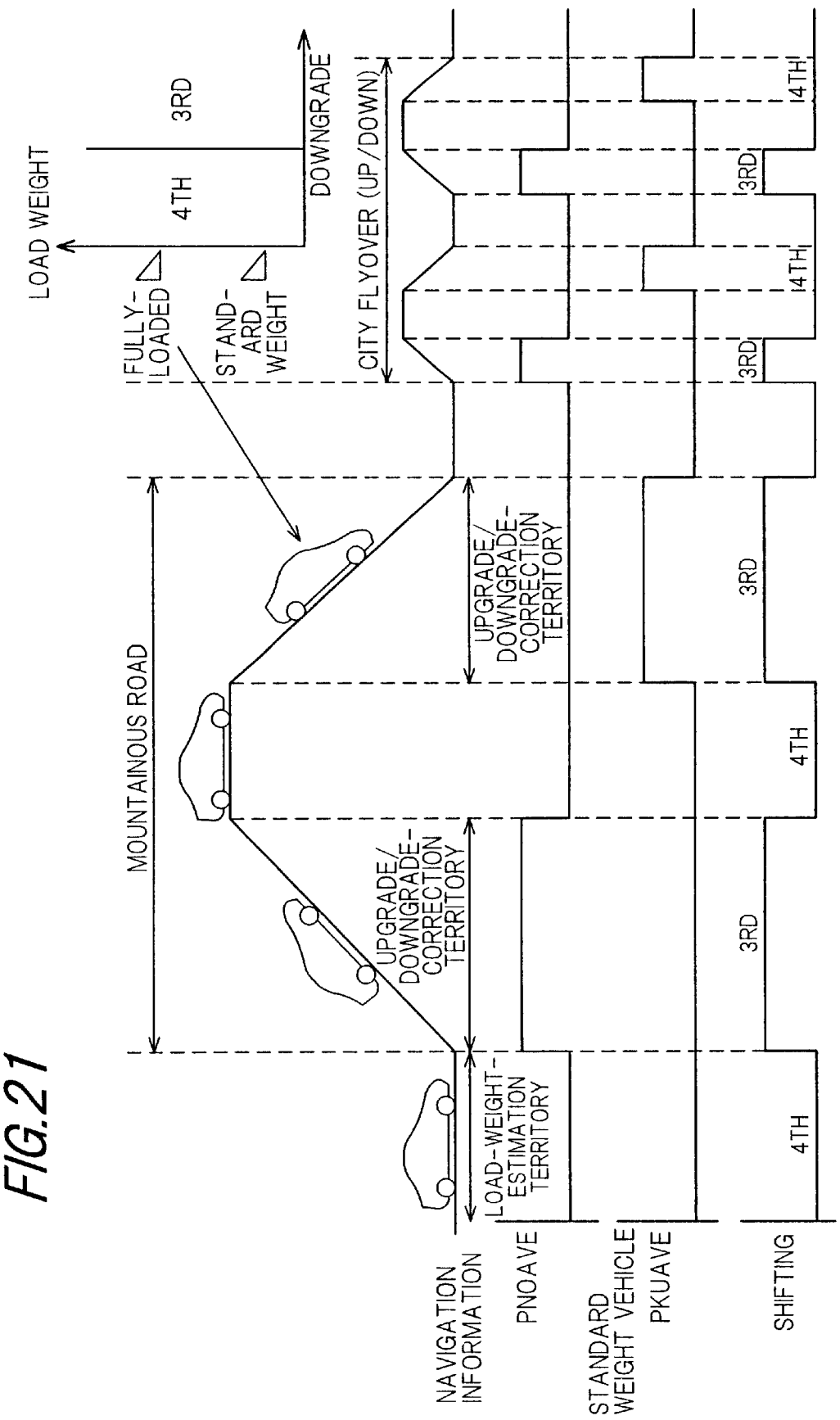
FIG. 21 is a time chart showing the procedures of the flow chart of FIG. 19.

FIG. 21 is a time chart showing the downgrade control without navigation information mentioned with reference to FIG. 19.

As mentioned above, when a predetermined downgrade (corresponding to #PKUWTH) continues for the predetermined time (#TMWTH), the downgrade parameter PKUAVE (PKUAVE2) is corrected (increased). As a result, the steep-downgrade map is selected and hence, the 3rd-gear region is frequently used, enabling to effect the engine braking effect sufficiently.

Returning to the explanation of the flow chart of FIG. 2, the program proceeds to S49 in which the running conditions are determined and the shift (map) characteristics are changed in response to the determination.

Figure 22:
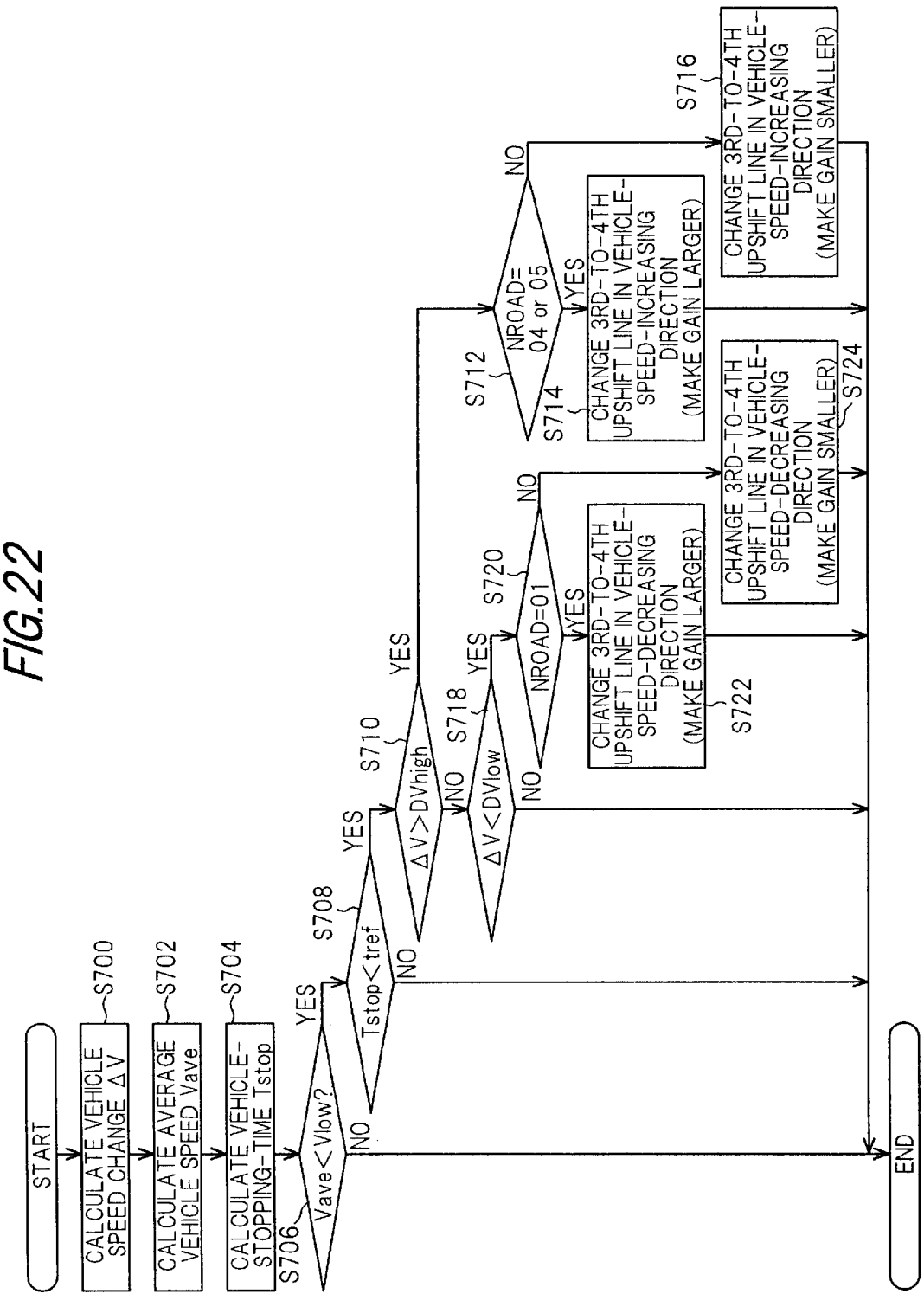
FIG. 22 is a flow chart showing the subroutine of running condition determination and map characteristic changing referred to in the flow chart of FIG. 2.

FIG. 22 is a flow chart showing the subroutine for these procedures.

Explaining the flow chart, the program begins in S700 in which the vehicle speed change $\Delta V$, more precisely the integrated value of the vehicle speed change $\Delta V$ is calculated. Specifically, the value is calculated as follows.

$$\Delta V(t)=\Delta V(t-1)\times N+\{V(t)-V(t-1)\}/(N+1)[m/s^2]$$

wherein, N: the number of loops of the program shown in FIG. 2 (the number that the program shown in FIG. 2 is executed); t: the sample number of discrete system (the time that the program shown in FIG. 2 is executed).

More specifically, this is done by calculating the current value of the vehicle speed change by obtaining the first-order difference or differential between the current value of the detected vehicle speed V(t) read in S10 of the flow chart of FIG. 2 and that of the preceding value V(t−1), and by calculating a weighted-average value between the current value of the vehicle speed change thus obtained and the last value of the weighted-averages successively made for the values Vm in the predetermined number N of program loops.

The program then proceeds to S702 in which the average vehicle speed (an average value of the vehicle speed) Vave is calculated. Specifically, this is done as follows.

$$m=t-1$$
$$Vave(t)=[\Sigma Vavem\times M+V(t)]/(M+1)[m/s]$$
$$n=t-M$$

wherein, M: the number of loops of the program shown in FIG. 2 (the number that the program shown in FIG. 2 is executed). It should be noted that the indication of (t) for the current value is omitted in the specification and figures.

More specifically, this is done by calculating a simple-average value between the current vehicle speed V and the last value of the simple-averages successively made for the values Vavem in the predetermined number M (e.g., corresponding to 5 min.) of program loops.

The program then proceeds to S704 in which the time Tstop during which the vehicle 1 stops. This is done by determining whether the detected vehicle speed V is zero or thereabout and whether the detected engine speed NE is less than or equal to the idling speed (e.g., 500 rpm to 760 rpm) and if they are, by measuring the time lapse at that situation. More specifically, in a separate routine (not shown) the time lapse is measured successively when the vehicle is under such a situation and the measured time is stored in a memory such that the stored time is read out in this step. Here, any of the measured times can be used. For example, it is possible to read out the most-recent-measured time. Alternatively, it is possible to read out all the measured times within a predetermined period (e.g., 1 hour), to calculate and use an average value. It is still possible to read out all the measured times within the predetermined period and to select and use the largest time thereamong.

The program then proceeds to S706 in which it is determined whether the calculated average vehicle speed Vave is less than a predetermined vehicle speed (e.g., 40 km/h). When the result is negative, since this indicates that the vehicle is not travelling on a traffic jammed road, the program is immediately terminated. On the other hand, when the result in S706 is affirmative, the program proceeds to S708 in which it is determined whether the vehicle-stopping-time Tstop is less than a predetermined time Tref. When the result is negative, since this also indicates that the vehicle is not travelling on a traffic jammed road, the program is immediately terminated.

On the other hand, when the result in S708 is affirmative, the program proceeds to S710 in which it is determined whether the vehicle speed change $\Delta V$ (more precisely the integrated value of the vehicle speed change $\Delta V$) is greater than a first predetermined value DVhigh. When the result is affirmative, since the average vehicle speed is relatively low, the vehicle-stopping-time is relatively short and the vehicle speed change is relatively great, it can be deduced or estimated that the vehicle 1 runs on a relatively narrow road with obstacles such as an alley, which is hereinafter referred to as "alley-running".

In order to verify the deduction, the program proceeds to S712 in which the communication is made with the CPU 72 of the aforesaid navigation system 70 to input the information on the kinds of road stored in the navigation system 70 to determine what kind of road (such as a town road) the vehicle 1 is now running on.

Specifically, the navigation system 70 stores in the CD-ROM 74 the road map information in nodes (coordinate positional information) and the following kinds of roads (indicated by number) where the vehicle 1 is expected to travel.

Expressway: 01
National (state) road: 02
Prefectural road: 03
Town road: 04
Others: 05

These kinds of road indicated by number are basically classified from the width (except for the expressway) such that the road width decreases with increasing numbers. These kinds of road are hereinafter referred to generally as "NROAD".

Thus, it is determined in S712 whether NROAD is 04 or 05, in other words, it is determined whether the vehicle 1 runs on a road such as a town road or other road. With this, it can be determined whether the deduction that the vehicle is under alley-running is correct or not.

Figure 23:
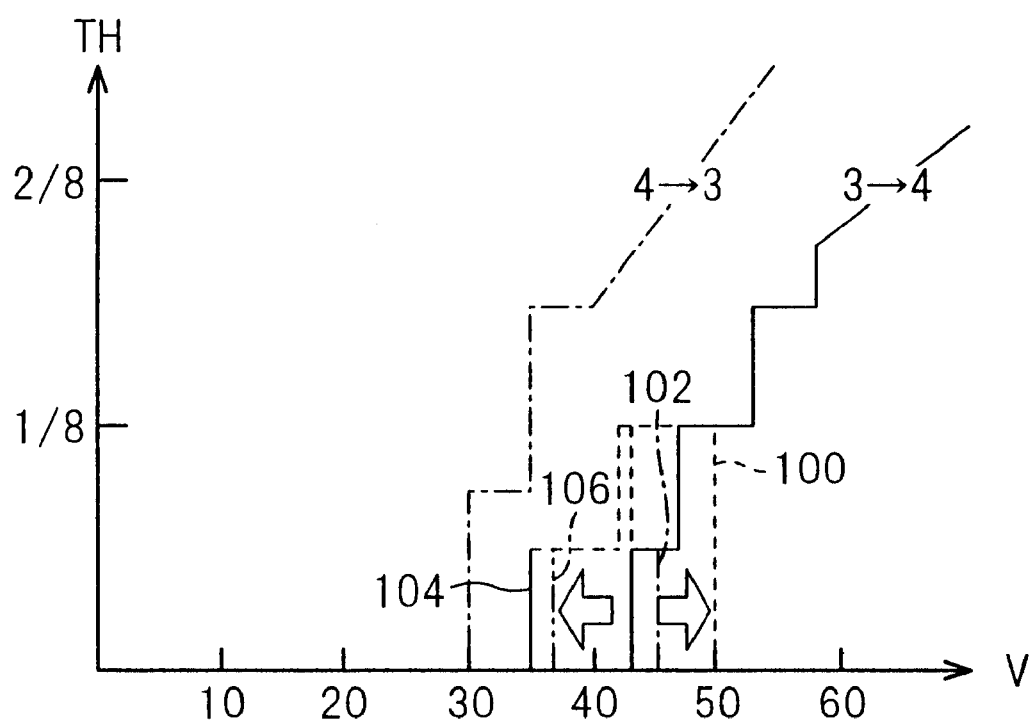
FIG. 23 is a view, similar to a portion of FIG. 6, but showing the amount of map characteristic changing of the level-road map referred to in the flow chart of FIG. 22.

When the result is affirmative, since this indicates that the deduction is correct, the program proceeds to S714 in which the 3rd-to-4th -upshift line of the level-road map (map number 2; indicated in FIG. 6) is changed to phantom lines generally depicted by 100 in the direction in which the vehicle speed increases, as shown in FIG. 23.

As mentioned above, when the vehicle is under the alley-running, the vehicle driving should be conducted paying careful attention to all of the surroundings, and the operation of the accelerator pedal and the brake pedal increases. If the gears are shifted frequently in response to the accelerator pedal operation, this will cause shift hunting (the hunting in control) to occur and degrade the driveability.

However, the 3rd-to-4th -upshift line is changed in the vehicle-speed-increasing direction when the vehicle is determined to be under alley-running. With this, upshift is less likely to occur such that the 3rd gear range is likely to be used, thereby preventing the driveability from being degraded due to the shift hunting.

Moreover, the kind of road is discriminated from the navigation information so as to determine whether or not the deduction that the vehicle is under alley-running is correct. With this, unnecessary gear-shift can be avoided.

On the other hand, when the result in S712 is negative, the program proceeds to S716 in which the 3rd-4th -upshift line of the level-road map (shift program) is similarly changed to phantom lines generally depicted by 102 in the vehicle-speed-increasing direction, as shown in FIG. 23. It should be noted here that the amount of change in S718 is less than that in S716 as shown in the figure. In other words, the gain in this step is made smaller than that of S716. The reason is that, although it was once deduced that the vehicle is under alley-running, it was incorrect, since the vehicle runs, in fact, on a relatively wide road, either a prefectural road, a state road or an expressway. Accordingly, it can be concluded that the degradation of the driveability due to the shift hunting would be less likely to occur.

On the other hand, when the result in S710 is negative, the program proceeds to S718 in which it is determined whether the vehicle speed change ΔV (more precisely, the integrated value of the vehicle speed change ΔV) is less than a second predetermined value DVlow.

When the result is affirmative, since the average vehicle speed is relatively low, the vehicle-stopping-time is relatively short and the vehicle speed change is relatively small, it can be deduced or estimated that the vehicle 1 runs on an expressway under traffic jam, which is hereinafter referred to as "jammed-expresswayrunning".

In order to verify the deduction in the similar manner, the program proceeds to S720 in which it is determined whether NROAD is 01. When the result is affirmative, the program proceeds to S722 in which the 3rd-to-4th -upshift line of the level-road map is changed to phantom lines generally depicted by 104 in the direction in which the vehicle speed decreases, as shown in FIG. 23.

As mentioned above, when the vehicle runs at a low speed on a traffic jammed expressway, if the gear is unnecessarily kept to a lower gear, the engine braking is effected such that the vehicle operator feels the frequency of the engine braking effect too much, thereby similarly degrading the driveability. However, since the 3rd-to-4th -upshift line is changed in the vehicle-speed-decreasing direction when the vehicle is determined to be under the jammed-expressway-running, upshift is more likely to occur such that the 4th gear range is more likely to be used, thereby decreasing the number of engine braking operation and thus preventing the driveability from being degraded.

Moreover, the kind of road is discriminated from the navigation information so as to determine whether or not the deduction that the vehicle is under the jammed-expressway-running is correct. With this, unnecessary gear-shift can also be avoided.

On the other hand, when the result in S720 is negative, the program proceeds to S724 in which the 3rd-4th -upshift line of the level-road map is similarly changed to phantom lines generally depicted by 106 in the vehicle-speed-decreasing direction, as shown in FIG. 23. It should be noted here that the amount of change in S724 is less than that in S722 as shown in the figure. In other words, the gain in this step is made smaller than that of S722. Just like the case in S716, the reason is that, although it was once deduced that the vehicle is under the jammed-expressway-running, it was incorrect and it can be concluded that the degradation of the driveability due to the aforesaid cause would be less likely to occur.

It should be noted here that the reason why the characteristics of the level-road map is changed in S714 and the other steps is, needless-to-say, that the procedures shown in the flow chart of FIG. 22 is based on the level-road running.

Explaining the procedures in the flow chart of FIG. 22 with reference to FIG. 24 and on, the inventors analyzed the running conditions (such as the alley-running, a jammed-town-running, the jammed-expressway-running, a suburban-running) from the average vehicle speed, the integrated value of the vehicle speed change and the vehicle-stopping-time, and obtained the result shown in FIG. 24.

Figure 25:
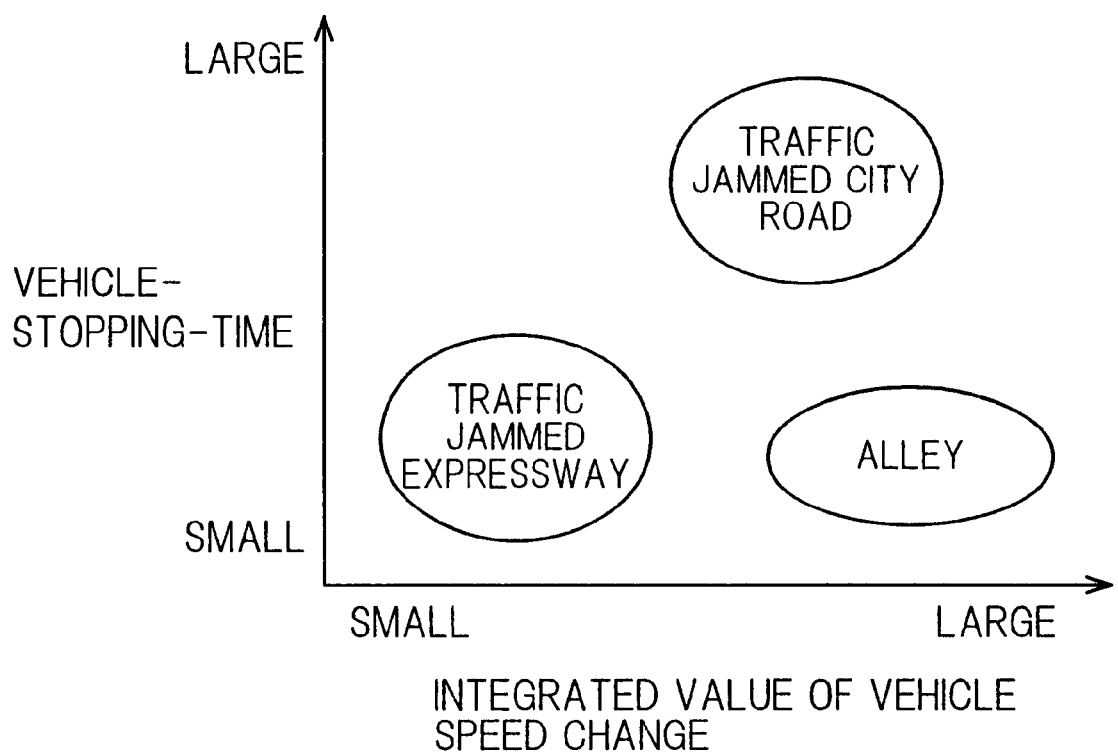
FIG. 25 is an explanatory graph showing the characteristics of the vehicle-stopping-time relative to the integrated value of the vehicle speed change in the result shown in FIG. 24.

Extracting the characteristics of the vehicle-stopping-time relative to the integrated value of the vehicle speed change in the obtained result, they were as shown in FIG. 25. It was noted from the figure that, although it was not possible to discriminate the occurrence of the jammed-town-running (and the suburban-running, not shown) from the parameters, it was possible to discriminate the occurrence of the jammed-expressway-running or the alley-running from the parameters.

Figure 26:
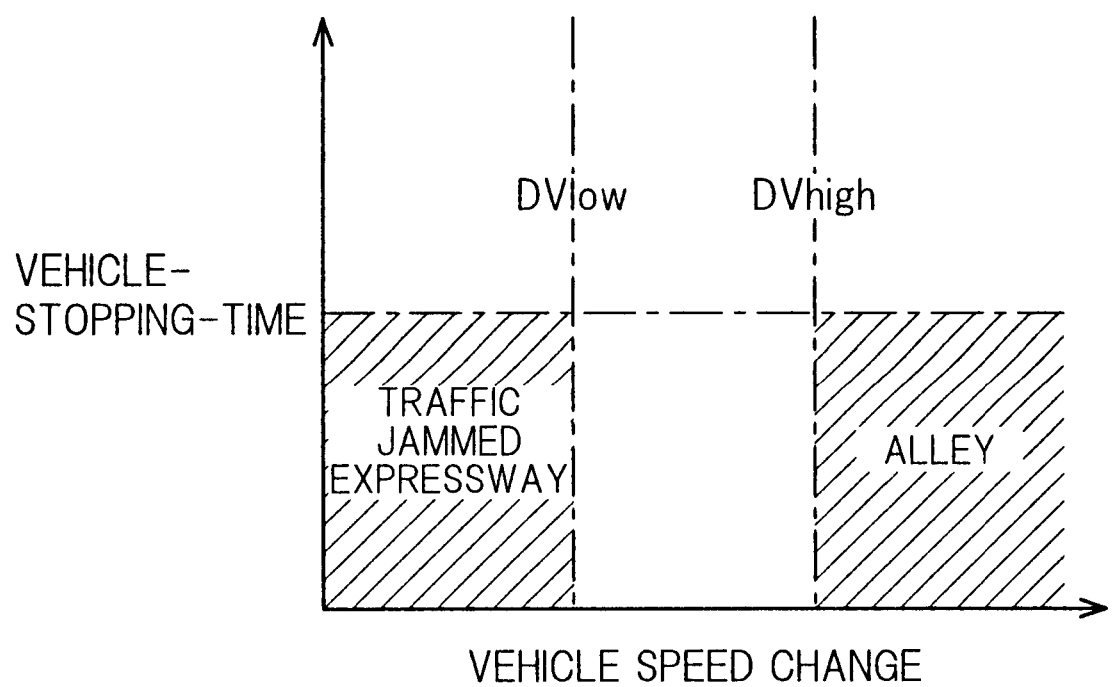
FIG. 26 is an explanatory graph, similar to FIG. 25, but explaining the procedures and predetermined values referred to in the flow chart of FIG. 22.

Accordingly, as shown in FIG. 26, the aforesaid predetermined values DVhigh, DVlow and Tref are predetermined as threshold values with respect to the integrated value of the vehicle speed change and the vehicle-stopping-time. Using these values and the average vehicle speed as an additional parameter, the system is configured to deduce the hatched portions (running conditions) as the jammed-expressway-running or the alley-running. Moreover, the navigation information relating to the kinds of road is utilized to determine whether or not the deduction is correct. It should be noted that the portions exceeding the threshold values in the figure are the same as those in the characteristics of the level-road map shown in FIG. 6.

Returning to the explanation of the flow chart of FIG. 2, the program proceeds to S50 in which an output gear (gear ratio) to be shifted to (named SO) is determined in accordance with the selected (determined) map using the detected vehicle speed V and throttle opening TH as address data.

Figure 27:
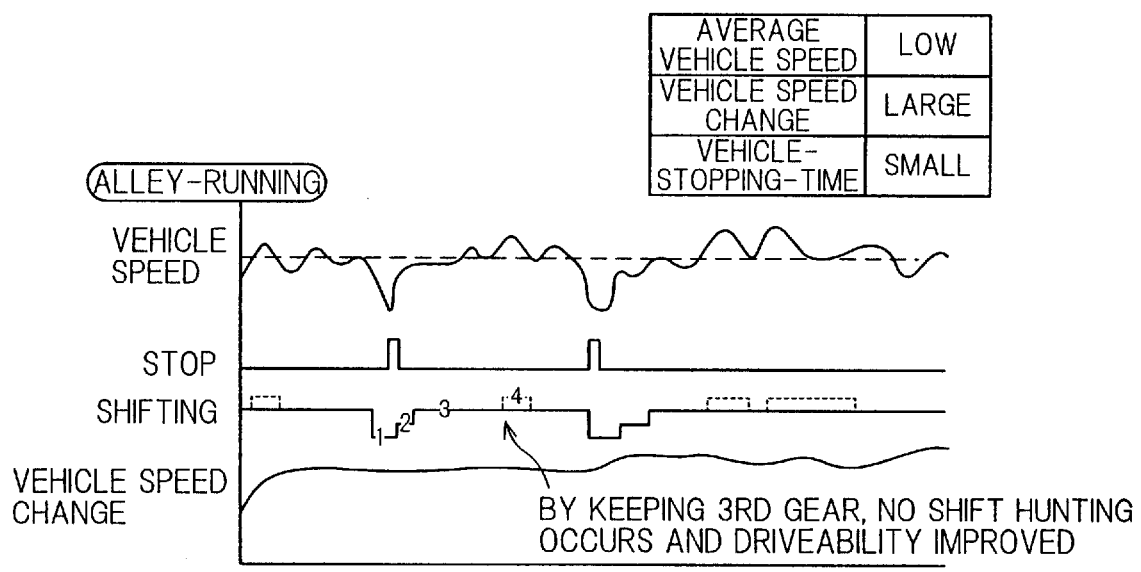
FIG. 27 is a time chart showing the procedures of the aforesaid running condition determination and map characteristic changing taking the vehicle running on an alley.
Figure 28:
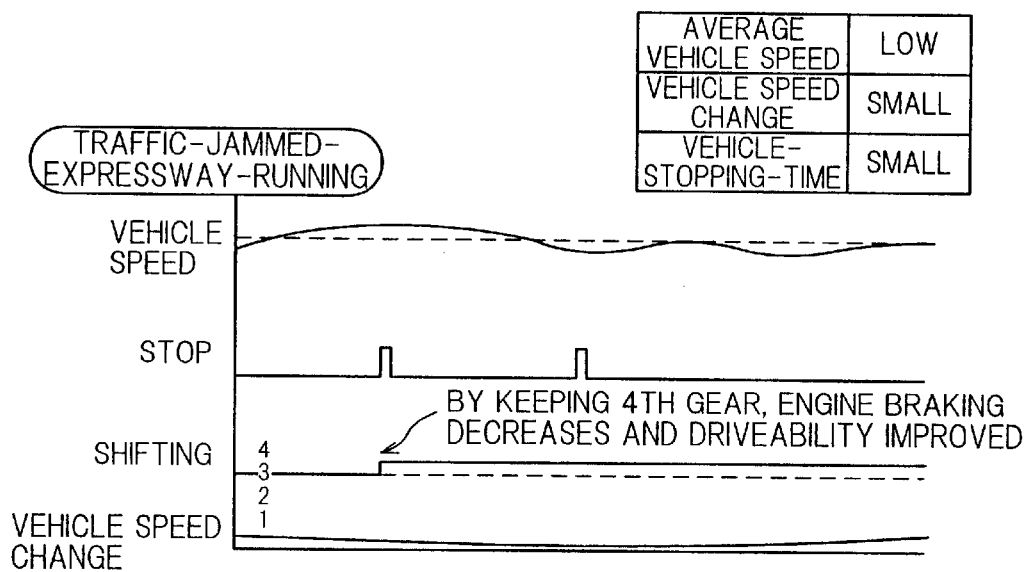
FIG. 28 is a time chart showing the procedures of the aforesaid running condition determination and map characteristic changing taking the vehicle running on a traffic jammed expressway.

FIGS. 27 and 28 are time charts showing the procedures of the aforesaid running condition determination and map characteristic changing.

FIG. 27 illustrates the procedures in the alley-running, wherein the numerals at the item "SHIFTING" indicates the gear (ratio) and dashed lines indicates the procedures in the prior art. By conducting the aforesaid running condition determination (and the map characteristic changing), the gear is kept to the 3rd gear, thereby preventing the shift hunting from occurring and thus, improving the driveability.

FIG. 28 illustrates the procedures in the jammed-expressway-running, wherein the dashed lines at the item "SHIFTING" indicates the procedures in the prior art. By conducting the aforesaid running condition determination (and the map characteristic changing), the gear is kept in the 4th gear, thereby enabling to run at a relatively low engine speed NE, and hence preventing the engine braking from being frequently effected and thus, improving the driveability.

Since the embodiment is configured such that the grade parameter is corrected when it is determined based on the navigation information that the vehicle runs on a road within the upgrade/downgrade-correction territory (i.e., a specific road), it can determine the gear ratio more properly by incorporating the navigation information in the shift control. Even when the navigation information (i.e. road information) is temporarily invalid, since the navigation information (road information) is only used to determine whether the vehicle runs on the specific road (i.e., a road in the territory), the gear ratio determination is not affected thereby.

If the navigation information is given the priority as disclosed in the prior art, there will be an additional disadvantage that a correction value or manipulated variable will be small, taking into account the possibility that the navigation information could be erroneous. In this embodiment, on the contrary, since the navigation information and the conventional shift control are used together, it becomes possible to set a correction value or manipulated variable to be larger, enabling to improve the response of control.

Moreover, having been configured in the foregoing manner, the 3rd gear region is likely to be used particularly when the vehicle runs on a downgrade road such as a mountainous road, enabling the vehicle operator to reduce the use of brake and hence, enhancing the driveability at running on a downgrade road.

Furthermore, since the weight of load is estimated and the grade parameter is corrected by the estimated value, the gear ratio can be determined properly.

Furthermore, it suffices if the navigation information includes at least the upgrade/downgrade-correction territory, more precisely the information indicating whether the vehicle runs on a mountainous down-grade road and the information of road corners or divergences. In other words, since the road grade information need not be stored, the data to be stored in the CD-ROM 74 of the navigation system 70 is relatively smaller than that in the prior-art system, decreasing the volume of calculation and rendering the system advantageous in cost. Since the grade parameter is corrected and the shift control is effected, the control response is not degraded. Even when the instantaneous position of the vehicle is not detected accurately, the control is not affected by this insufficient detection.

The embodiment is configured to have a system for controlling an automatic transmission (T) of a vehicle (1) having an input shaft (MS) connected to an internal combustion engine (E) mounted on the vehicle and an output shaft (CS) connected to driven wheels (W) of the vehicle, the transmission transmitting output torque generated by the engine and inputted through the input shaft to the driven wheels through the output shaft, including: operating condition detecting means (vehicle speed sensor S2, throttle position sensor S1, ECU, S10) for detecting operating conditions of the engine and the vehicle including at least a vehicle speed (V) and a throttle opening (TH): grade parameter determining means (ECU, S10–S36) for determining a grade parameter (PNOAVE, PKUAVE) indicative of upgrade or downgrade of a road on which the vehicle runs; shift program selecting means (ECU, S46, S48, S100–S144) for selecting one from among a plurality of shift programs based on the determined grade parameter; and gear ratio determining means (ECU, S49, S50) for determining a gear ratio (SO) based on the selected shift program. The system includes: vehicle speed change calculating means (ECU, S49, S700) for calculating a vehicle speed change (ΔV) in the detected vehicle speeds (V); road kind discriminating means (ECU, S49, S712, S720) for discriminating a kind of the road (NROAD) on which the vehicle runs; vehicle-stopping-time calculating means (ECU, S49, S704) for calculating a vehicle-stopping-time (Tstop) during which the vehicle stops; vehicle running condition deducing means (ECU, S49, S706, S708, S710, S718) for deducing whether the vehicle is under a specific running condition based on at least the calculated vehicle speed change and the calculated vehicle-stopping-time; and shift program characteristic changing means (ECU, S49, S714, S716, S722, S724) for changing characteristics of the selected shift program based on the deduced running condition and the discriminated kind of the road such that the gear ratio determining means determines the gear ratio based on the shift program whose characteristics are changed.

In the system, the vehicle running condition deducing means deduces whether the vehicle runs on a relatively narrow road; and the shift program characteristic changing means changes an upshift line of the selected shift program in a direction in which the vehicle speed increases by a predetermined first amount such that upshift is little likely to occur.

The system further includes; deduction verifying means for verifying whether the deduced running condition is correct; and the shift program characteristic changing means changes the upshift line of the selected shift program in the direction in which the vehicle speed increases by a predetermined second amount, which is larger than the predetermined first amount, when the deduced running condition is verified to be correct such that upshift is less likely to occur.

In the system, the upshift line defines an upshift to a smallest gear ratio (4th gear).

In the system, the vehicle running condition deducing means deduces whether the vehicle runs on a traffic jammed expressway; and the shift program characteristic changing means changes an upshift line of the selected shift program in a direction in which the vehicle speed decreases by a predetermined third amount such that upshift is likely to occur.

The system further includes; deduction verifying means for verifying whether the deduced running condition is correct; and the shift program characteristic changing means changes the upshift line of the selected shift program in the direction in which the vehicle speed decreases by a predetermined fourth amount, which is larger than the predetermined third amount, when the deduced vehicle running condition is correct such that upshift is more likely to occur.

In the system, the upshift line defines an upshift to a smallest gear ratio (4th gear).

The system further includes: average vehicle speed calculating means (ECU, S49, S702) for calculating an average value (Vave) of the detected vehicle speeds (V); and the vehicle running condition deducing means deduces the vehicle running condition based on the calculated vehicle speed change, the calculated vehicle-stopping-time and the calculated average vehicle speed.

In the system, the road kind discriminating means includes: a navigation system (70) which stores navigation information including kinds of roads on which the vehicle is expected to run; and the road kind discriminating means for discriminating the kind of the road on which the vehicle runs based on the navigation information.

It should be noted in the above, although five kinds of maps are prepared such that one of them is selected in response to the grade parameter, the invention should not be limited to this configurations. Instead, it is alternatively possible to decrease or increase the number of maps.

It should also be noted in the above, although the navigation system using the GPS satellite system is used to detect the current position, any other kind of navigation system may instead be used.

While the invention has thus been shown and described with reference to specific embodiments, it should be noted that the invention is in no way limited to the details of the described arrangements but changes and modifications may be made without departing from the scope of the appended claims.

What is claimed is:

1. A system for controlling an automatic transmission of a vehicle having an input shaft connected to an internal combustion engine mounted on the vehicle and an output shaft connected to driven wheels of the vehicle, the transmission transmitting output torque generated by the engine and inputted through the input shaft to the driven wheels through the output shaft, including:
   operating condition detecting means for detecting operating conditions of the engine and the vehicle including at least a vehicle speed and a throttle opening:
   grade parameter determining means for determining a grade parameter indicative of upgrade or downgrade of a road on which the vehicle runs;
   shift program selecting means for selecting one from among a plurality of shift programs based on the determined grade parameter; and
   gear ratio determining means for determining a gear ratio based on the selected shift program;
   wherein the system includes:
   vehicle speed change calculating means for calculating a vehicle speed change in the detected vehicle speeds;
   road kind discriminating means for discriminating a kind of the road on which the vehicle runs;
   vehicle-stopping-time calculating means for calculating a vehicle-stopping-time during which the vehicle stops;
   vehicle running condition deducing means for deducing whether the vehicle is under a specific running condition based on at least the calculated vehicle speed change and the calculated vehicle-stopping-time; and
   shift program characteristic changing means for changing characteristics of the selected shift program based on the deduced running condition and the discriminated kind of the road such that the gear ratio determining means determines the gear ratio based on the shift program whose characteristics are changed.

2. A system according to claim 1, wherein,
   the vehicle running condition deducing means deduces whether the vehicle runs on a relatively narrow road; and
   the shift program characteristic changing means changes an upshift line of the selected shift program in a direction in which the vehicle speed increases by a predetermined first amount such that upshift is little likely to occur.

3. A system according to claim 2, further including;
   deduction verifying means for verifying whether the deduced running condition is correct; and
   the shift program characteristic changing means changes the upshift line of the selected shift program in the direction in which the vehicle speed increases by a predetermined second amount, which is larger than the predetermined first amount, when the deduced running condition is verified to be correct such that upshift is less likely to occur.

4. A system according to claim 2, wherein the upshift line defines an upshift to a smallest gear ratio.

5. A system according to claim 1, wherein,
   the vehicle running condition deducing means deduces whether the vehicle runs on a traffic jammed expressway; and
   the shift program characteristic changing means changes an upshift line of the selected shift program in a direction in which the vehicle speed decreases by a predetermined third amount such that upshift is likely to occur.

6. A system according to claim 5, further including;
   deduction verifying means for verifying whether the deduced running condition is correct; and
   the shift program characteristic changing means changes the upshift line of the selected shift program in the direction in which the vehicle speed decreases by a predetermined fourth amount, which is larger than the predetermined third amount, when the deduced vehicle running condition is correct such that upshift is more likely to occur.

7. A system according to claim 5, wherein the upshift line defines an upshift to a smallest gear ratio.

8. A system according to claim 1, further including:
   average vehicle speed calculating means for calculating an average value of the detected vehicle speeds; and
   the vehicle running condition deducing means deduces the vehicle running condition based on the calculated vehicle speed change, the calculated vehicle-stopping-time and the calculated average vehicle speed.

9. A system according to claim 1, wherein the road kind discriminating means includes:
   a navigation system which stores navigation information including kinds of roads on which the vehicle is expected to run; and
   the road kind discriminating means for discriminating the kind of the road on which the vehicle runs based on the navigation information.

10. A method of controlling an automatic transmission of a vehicle having an input shaft connected to an internal combustion engine mounted on the vehicle and an output shaft connected to driven wheels of the vehicle, the transmission transmitting output torque generated by the engine and inputted through the input shaft to the driven wheels through the output shaft, including:
   detecting operating conditions of the engine and the vehicle including at least a vehicle speed and a throttle opening:
   determining a grade parameter indicative of upgrade or downgrade of a road on which the vehicle runs;
   selecting one from among a plurality of shift programs based on the determined grade parameter; and
   determining a gear ratio based on the selected shift program;
   wherein the method including the steps of:
   calculating a vehicle speed change in the detected vehicle speeds;
   discriminating a kind of the road on which the vehicle runs;

calculating a vehicle-stopping-time during which the vehicle stops;

deducing whether the vehicle is under a specific running condition based on at least the calculated vehicle speed change and the calculated vehicle-stopping-time; and changing characteristics of the selected shift program based on the deduced running condition and the discriminated kind of the road such that the gear ratio is determined based on the shift program whose characteristics are changed.

11. A method according to claim 10, wherein, the step of deducing deducing whether the vehicle runs on a relatively narrow road; and the changing step changing an upshift line of the selected shift program in a direction in which the vehicle speed increases by a predetermined first amount such that upshift is little likely to occur.

12. A method according to claim 11, further including the step of;

verifying whether the deduced running condition is correct; and the changing step changing the upshift line of the selected shift program in the direction in which the vehicle speed increases by a predetermined second amount, which is larger than the predetermined first amount, when the deduced running condition is verified to be correct such that upshift is less likely to occur.

13. A method according to claim 11, wherein the upshift line defines an upshift to a smallest gear ratio.

14. A method according to claim 10, wherein, the step of deducing deducing whether the vehicle runs on a traffic jammed expressway; and the changing step changing an upshift line of the selected shift program in a direction in which the vehicle speed decreases by a predetermined third amount such that upshift is likely to occur.

15. A method according to claim 14, further including the step of;

verifying whether the deduced running condition is correct; and the changing step changing the upshift line of the selected shift program in the direction in which the vehicle speed decreases by a predetermined fourth amount, which is larger than the predetermined third amount, when the deduced vehicle running condition is correct such that upshift is more likely to occur.

16. A method according to claim 14, wherein the upshift line defines an upshift to a smallest gear ratio.

17. A method according to claim 10, further including the step of:

calculating an average value of the detected vehicle speeds; and the deducing step deducing the vehicle running condition based on the calculated vehicle speed change, the calculated vehicle-stopping-time and the calculated average vehicle speed.

18. A method according to claim 10, further including:

a navigation system which stores navigation information including kinds of roads on which the vehicle is expected to run; and the discriminating step discriminating the kind of the road on which the vehicle runs based on the navigation information.

* * * * *